US008572018B2

(12) United States Patent
Mishra et al.

(10) Patent No.: US 8,572,018 B2
(45) Date of Patent: *Oct. 29, 2013

(54) METHOD, SYSTEM AND SOFTWARE ARRANGEMENT FOR RECONSTRUCTING FORMAL DESCRIPTIVE MODELS OF PROCESSES FROM FUNCTIONAL/MODAL DATA USING SUITABLE ONTOLOGY

(75) Inventors: Bhubaneswar Mishra, Great Neck, NY (US); Marco Antoniotti, Baldwin Place, NY (US); Naren Ramakrishnan, Blacksburg, VA (US)

(73) Assignee: New York University, New York, NY (US)

( * ) Notice: Subject to any disclaimer, the term of this patent is extended or adjusted under 35 U.S.C. 154(b) by 556 days.

This patent is subject to a terminal disclaimer.

(21) Appl. No.: 12/803,195

(22) Filed: Jun. 21, 2010

(65) Prior Publication Data

US 2011/0119221 A1 May 19, 2011

Related U.S. Application Data

(63) Continuation-in-part of application No. 11/471,913, filed on Jun. 20, 2006, now Pat. No. 7,801,841.

(60) Provisional application No. 60/692,410, filed on Jun. 20, 2005.

(51) Int. Cl.
*G06F 17/00* (2006.01)
*G06N 7/00* (2006.01)
*G06N 7/08* (2006.01)

(52) U.S. Cl.
USPC .......................................................... 706/55

(58) Field of Classification Search
None
See application file for complete search history.

(56) References Cited

U.S. PATENT DOCUMENTS

| 4,866,635 A | 9/1989 | Kahn et al. |
| 6,052,657 A * | 4/2000 | Yamron et al. .................... 704/9 |
| 6,943,710 B2 * | 9/2005 | Marpe et al. .................. 341/106 |
| 7,574,409 B2 | 8/2009 | Patinkin |
| 2002/0022956 A1 * | 2/2002 | Ukrainczyk et al. .............. 704/9 |

(Continued)

FOREIGN PATENT DOCUMENTS

WO    WO 2005/0022412    3/2005

OTHER PUBLICATIONS

Fisher's exact test http://web.archive.org/web/20050131095331/ http://en.wikipedia.org/wiki/Fisher%27s_exact_test, 2004.*
Roweis et al. "A Unifying Review of Linear Gaussian Models", Neural Computation 11, 2009, pp. 305-345.*

(Continued)

*Primary Examiner* — Li-Wu Chang
(74) *Attorney, Agent, or Firm* — Dorsey & Whitney LLP

(57) ABSTRACT

A method, system and software arrangement in accordance with an exemplary embodiment of the present invention are provided to extract descriptive narrative from numerical experimental data augmented with ontological controlled vocabulary. One exemplary application of such system, method and software arrangement is in organizing gene-expression time course data in terms of biological processes that may be activated and deactivated as the biological system responds to its normal or perturbed environment. The present invention may also have biological applications to drug-or-vaccine discovery, understanding behavior of a cell in an altered diseased state (e.g., cancer, neuro-degeneration or auto-immune disease, etc.), genetically modifying a natural wild-type organism, genetic-engineering, etc. Other exemplary applications may include understanding neural behavior, market behavior of a population of users interacting on the Internet, etc.

17 Claims, 14 Drawing Sheets

(56) References Cited

U.S. PATENT DOCUMENTS

| | | |
|---|---|---|
| 2002/0099594 A1* | 7/2002 | Heard .......................... 705/10 |
| 2004/0019468 A1* | 1/2004 | De Moura et al. .............. 703/2 |
| 2004/0230105 A1* | 11/2004 | Geva et al. ................... 600/301 |
| 2006/0031217 A1 | 2/2006 | Smith et al. |
| 2006/0053135 A1 | 3/2006 | Beaumont et al. |
| 2006/0167827 A1 | 7/2006 | Asahara |
| 2006/0179074 A1 | 8/2006 | Martin et al. |
| 2006/0234244 A1 | 10/2006 | Kim et al. |
| 2006/0248045 A1 | 11/2006 | Toledano et al. |
| 2007/0168135 A1 | 7/2007 | Agarwal et al. |

OTHER PUBLICATIONS

Naren Ramakrishnan et al., "Reconstructing Formal Temporal Logic Models of Cellular Events using the GO Process Ontology" Dept. of Computer Science, Virginia Tech, Courant Inst. of Mathematical Sciences, New York University, 2005, pp. 1-2.

Paul T. Spellman et al., "Comprehensive Identification of Cell Cycle-regulated Genes of the Yeast *Saccharomyces cerevisiae* by Microarray Hybridization$^D$" Molecular Biology of the Cell vol. 9, Dec. 1998, pp. 3273-3297.

Fakrudin et al., "Genetic Variation of Cotton Bollworm, *Helicoverpa armigera* (Hubner) of South Indian Cotton Ecosystem Using RAPD Markers," Dec. 2004, pp. 1654-1657.

* cited by examiner

B

830

| W1-C1 | M/G1 | G1,S | G2,M | others |
|---|---|---|---|---|
| W1-C1 | 10 | 54 | 61 | 420 |
| W1-C2 | 20 | 150 | 107 | 501 |
| W1-C3 | | 167 | 148 | 475 |

830

| W1-C1 | M/G1 | G1,S | G2,M | others |
|---|---|---|---|---|
| W1-C1 | 60 | 29 | 105 | 521 |
| W1-C2 | 32 | | 92 | 335 |
| W1-C3 | 21 | 48 | 119 | 540 |

830

| W1-C1 | M/G1 | G1,S | G2,M | others |
|---|---|---|---|---|
| W1-C1 | 51 | 143 | 27 | 570 |
| W1-C2 | 30 | 170 | 38 | 418 |
| W1-C3 | 32 | 58 | | 408 |

840

| | W2-C1 | W2-C2 | W2-C3 |
|---|---|---|---|
| W1-C1 | 220 | 278 | 120 |
| W1-C2 | 240 | 205 | 323 |
| W2-C3 | 255 | 270 | 285 |

| | W3-C1 | W3-C2 | W3-C3 |
|---|---|---|---|
| W2-C1 | 280 | 256 | 179 |
| W2-C2 | 270 | 193 | 290 |
| W2-C3 | 241 | 207 | 280 |

FIG. 8B

METHOD, SYSTEM AND SOFTWARE ARRANGEMENT FOR RECONSTRUCTING FORMAL DESCRIPTIVE MODELS OF PROCESSES FROM FUNCTIONAL/MODAL DATA USING SUITABLE ONTOLOGY

CROSS-REFERENCE TO RELATED APPLICATIONS

The present application is a continuation-in-part of U.S. patent application Ser. No. 11/471,913 filed on Jun. 20, 2006, which issued as U.S. Pat. No. 7,801,841 on Sep. 21, 2010, which relates to and claims priority from U.S. Patent Application Ser. No. 60/692,410 filed on Jun. 20, 2005, the entire disclosures of which are hereby incorporated herein by reference.

STATEMENT REGARDING FEDERALLY SPONSORED RESEARCH

The present invention was developed, at least in part, using Government support under Contract No. F30602-01-2-0556 awarded by the Defense Advanced Research Project Agency, and National Science Foundation Grant Nos. ITR-0428344, CCF-0836649 and CCF-0937133. Therefore, the United States Federal Government may have certain rights in the invention.

COMPUTER PROGRAM LISTING AND RELATED INFORMATION/DATA APPENDIX

Attached herewith, as an Appendix, please find two (2) copies of the source code, tables, data and information associated with the source code on CD-R disks. The entire disclosure provided therein is hereby incorporated by reference. The CD-R disks provided in the disclosure comply with the requirements set forth in 37 C.F.R. §§1.52(e), 1.77(b)(4), and 1.96. The attached CD-R disks (COPY 1 and COPY 2) contain the following files, the last modified date of each file, and size associated therewith.

| File | Size | Type | Date |
|---|---|---|---|
| goalie-init.txt | 2 KB | Text Document | 8/29/2006 1:15 PM |
| cluster-accessions-view.lisp.txt | 8 KB | Text Document | 8/29/2006 12:42 PM |
| cluster-datestructure.lisp.txt | 14 KB | Text Document | 8/29/2006 1:16 PM |
| clustering-experiments-displays.li . . . | 1 KB | Text Document | 8/29/2006 12:43 PM |
| cluster-plots.lisp.txt | 2 KB | Text Document | 8/29/2006 12:44 PM |
| delivery-script.lisp.txt | 5 KB | Text Document | 8/29/2006 1:04 PM |
| delivery-script-dll.lisp.txt | 4 KB | Text Document | 8/29/2006 1:04 PM |
| delivery-script-test.lisp.txt | 4 KB | Text Document | 8/29/2006 1:04 PM |
| disj-redescription-test.lisp.txt | 1 KB | Text Document | 8/29/2006 12:58 PM |
| edges-test.lisp.txt | 1 KB | Text Document | 8/29/2006 12:44 PM |
| elements-tree-view.lisp.txt | 9 KB | Text Document | 8/29/2006 12:44 PM |
| file-menu.lisp.txt | 12 KB | Text Document | 8/29/2006 12:45 PM |
| genesis-clusterize.lisp.txt | 2 KB | Text Document | 8/29/2006 1:15 PM |
| goalie.lisp.txt | 15 KB | Text Document | 8/29/2006 1:16 PM |
| goalie.system.txt | 3 KB | Text Document | 8/29/2006 1:16 PM |
| goalie-console-interface.lisp.txt | 2 KB | Text Document | 8/29/2006 12:45 PM |
| goalie-database-setup-interface . . . | 4 KB | Text Document | 8/29/2006 12:45 PM |
| goalie-gui.system.txt | 1 KB | Text Document | 8/29/2006 12:47 PM |
| goalie-ids-package.lisp.txt | 1 KB | Text Document | 8/29/2006 1:17 PM |
| goalie-pkg.lisp.txt | 1 KB | Text Document | 8/29/2006 1:17 PM |
| goalie-user-interface.lisp.txt | 10 KB | Text Document | 8/29/2006 12:48 PM |
| goalie-user-interface.20041228.1 . . . | 6 KB | Text Document | 8/29/2006 12:49 PM |
| goalie-user-interface-common.lis . . . | 3 KB | Text Document | 8/29/2006 12:49 PM |
| goalie-user-interface-functions.li . . . | 3 KB | Text Document | 8/29/2006 12:49 PM |
| goaliezip.csh.txt | 1 KB | Text Document | 8/29/2006 1:05 PM |
| go-assoc-file-manip.lisp.txt | 4 KB | Text Document | 8/29/2006 1:15 PM |
| go-databases-menu.lisp.txt | 3 KB | Text Document | 8/29/2006 12:50 PM |
| graphsearch-support.lisp.txt | 3 KB | Text Document | 8/29/2006 1:14 PM |
| graphsearch-support.system.txt | 1 KB | Text Document | 8/29/2006 1:14 PM |
| graphsearch-support-package.li . . . | 1 KB | Text Document | 8/29/2006 1:14 PM |
| graph-view-common.lisp.txt | 2 KB | Text Document | 8/29/2006 12:50 PM |
| graph-view-displays.lisp.txt | 12 KB | Text Document | 8/29/2006 12:50 PM |
| graph-view-interface.lisp.txt | 11 KB | Text Document | 8/29/2006 12:51 PM |
| help-menu.lisp.txt | 4 KB | Text Document | 8/29/2006 12:51 PM |
| image-display-panel.lisp.txt | 6 KB | Text Document | 8/29/2006 12:51 PM |
| images-interface.lisp.txt | 5 KB | Text Document | 8/29/2006 12:53 PM |
| INSTALLATION.txt | 5 KB | Text Document | 8/29/2006 1:17 PM |
| lwdelidll.bat.txt | 1 KB | Text Document | 4/19/2004 12:40 PM |
| lqcuslink-associations.lisp.txt | 5 KB | Text Document | 8/29/2006 1:18 PM |
| lwdeli.bat.txt | 1 KB | Text Document | 12/24/2004 10:08 AM |
| lwdeli-linux.sh.txt | 1 KB | Text Document | 8/29/2006 1:13 PM |
| lwdeli-macosx.sh.txt | 1 KB | Text Document | 8/29/2006 1:14 PM |
| nyu-seb-4-windows.txt | 256 KB | Text Document | 8/29/2006 12:58 PM |
| nyu-seb-4-windows-020.txt | 43 KB | Text Document | 8/29/2006 12:58 PM |
| nyu-seb-4-windows-020-conn.txt | 92 KB | Text Document | 8/29/2006 12:59 PM |
| nyu-seb-4-windows-070.txt | 14 KB | Text Document | 8/29/2006 12:59 PM |
| nyu-seb-4-windows-070-conn.txt | 16 KB | Text Document | 8/29/2006 12:59 PM |

-continued

| | | | |
|---|---|---|---|
| nyu-seb-4-windows-080.txt | 14 KB | Text Document | 8/29/2006 12:59 PM |
| nyu-seb-4-windows-095.txt | 223 KB | Text Document | 8/29/2006 12:59 PM |
| progress-dialog.lisp.txt | 3 KB | Text Document | 8/29/2006 12:54 PM |
| raw-data.lisp.txt | 2 KB | Text Document | 8/29/2006 1:19 PM |
| README.txt | 1 KB | Text Document | 8/29/2006 1:19 PM |
| redescription.lisp.txt | 18 KB | Text Document | 8/29/2006 1:20 PM |
| redescription-20041203.lisp.txt | 9 KB | Text Document | 8/29/2006 1:20 PM |
| redescription-20041206.lisp.txt | 10 KB | Text Document | 8/29/2006 1:20 PM |
| redescription-20041212.lisp.txt | 13 KB | Text Document | 8/29/2006 1:21 PM |
| redescription-20041216.lisp.txt | 12 KB | Text Document | 8/29/2006 1:21 PM |
| redescription-files.lisp.txt | 1 KB | Text Document | 8/29/2006 1:21 PM |
| redescription-panel.lisp.txt | 1 KB | Text Document | 8/29/2006 12:54 PM |
| registration.xml.txt | 1 KB | Text Document | 8/29/2006 12:40 PM |
| split-sequence.lisp.txt | 10 KB | Text Document | 8/29/2006 1:21 PM |
| start-gui.lisp.txt | 5 KB | Text Document | 8/29/2006 12:55 PM |
| summarize.lisp.txt | 12 KB | Text Document | 8/29/2006 1:22 PM |
| tar-exclude.txt | 1 KB | Text Document | 8/29/2006 1:22 PM |
| test-hiding-interface.lisp.txt | 3 KB | Text Document | 8/29/2006 12:55 PM |
| time-course-redescription-dlg.lis . . . | 2 KB | Text Document | 8/29/2006 12:55 PM |
| tl.system.txt | 1 KB | Text Document | 8/29/2006 1:01 PM |
| tl-package.lisp.txt | 3 KB | Text Document | 8/29/2006 1:01 PM |
| tl-pprinting.lisp.txt | 4 KB | Text Document | 8/29/2006 1:01 PM |
| tl-syntax.lisp.txt | 27 KB | Text Document | 8/29/2006 1:02 PM |
| tools-menu.lisp.txt | 7 KB | Text Document | 8/29/2006 12:55 PM |
| venn-display.lisp.txt | 6 KB | Text Document | 8/29/2006 12:56 PM |
| web-access.lisp.txt | 3 KB | Text Document | 8/29/2006 12:56 PM |
| windowed-clustering-experiment . . . | 21 KB | Text Document | 8/29/2006 1:22 PM |
| windowed-clustering-test.lisp.txt | 4 KB | Text Document | 8/29/2006 1:00 PM |
| windowed-experiment-setup-fun . . . | 2 KB | Text Document | 8/29/2006 12:57 PM |
| windowed-experiment-setup-pa . . . | 4 KB | Text Document | 8/29/2006 12:57 PM |
| wrair-seb-50ug-wc.lisp.txt | 4 KB | Text Document | 8/29/2006 1:00 PM |
| yeast-cell-cycle-data.lisp.txt | 4 KB | Text Document | 8/29/2006 1:00 PM |

FIELD OF THE INVENTION

The present invention relates generally to methods, systems and software arrangements for reconstructing formal descriptive models of processes from functional/modal data using a particular ontology or a controlled vocabulary.

BACKGROUND INFORMATION

Analysis of functional or modal sets of data may focus on particular targeted characteristics or behaviors of subsets of the data, but it may not otherwise provide global and/or dynamic perspectives (e.g., invariants) that can be inferred collectively from a set of data. The conventional use of controlled vocabularies to describe sets of data may exploit only the taxonomical properties (e.g., membership or set containment) of the ontology, and likely may not otherwise use process-oriented properties to present dynamical perspectives on the whole systems, e.g., in biological systems. However, such dynamical perspectives can be important in obtaining a better analysis, e.g., a process-level understanding of the underlying dynamics and relationships that may be acting to produce the observed data.

Useful information can be obtained for characterizing a dynamical system by encoding its properties into the vernacular of temporal logic. Temporal logic may be defined in terms of Kripke structures, which can be expressed in the form (V, E, P). This can be understood to represent a "semantic support" for hybrid systems. Here, (V, E) can be understood to represent a directed graph having a plurality of reachable states of the system as vertices, V, and state transitions of the system as directed edges, E. For example, a classic cell-cycle can be characterized by six states: M, G1(I), G1(II), S, G2 and G0. P can represent a labeling of the states of the system with properties that apply to each state.

Conventional model systems and/or experimental conditions may be used conventionally to formally define a Kripke structure. Defining a Kripke structure can require defining states, a state transition diagram and providing a labeling of the states using a particular vocabulary.

A redescription can be understood to mean a shift of vocabulary, e.g., a different way of communicating a given aspect of information. Redescription mining is a technique that may be used to find sets (e.g., sets of genes) that can be associated with multiple definitions. In biological systems, the inputs to a redescription mining technique may be of different forms, e.g., a universal set of open reading frames ("ORF"s) associated with a particular organism, and various subsets, or "descriptors," which may be defined over this universal set. These subsets can be based on diverse sets of information, e.g., prior biological knowledge, or they may be defined by the outputs of algorithms operating on gene expression data. An exemplary descriptor can be from the field of systems biology, e.g., "genes involved in glucose biosynthesis."

Redescription mining can connect diverse vocabularies by relating set-theoretic constructs formed over the descriptors. For example, it may be possible to determine, in a biological system, that "genes expressed in the desiccation experiment except those participating in universal stress response" is the same as "genes significantly expressed 2-fold positively or negatively in the salt stress experiment." This redescription relates a set difference in the first descriptor to a set union in the second descriptor. Such equivalence relationships can assist in unifying diverse ways of qualifying information by identifying regions of similarity and/or overlap.

Microarray technologies can be utilized to analyze biological processes, e.g., to characterize cellular transcriptional states by simultaneously measuring mRNA abundance of many thousands of genes. The levels of gene expression (absolute or relative), which can be measured while a cell is subjected to a particular ambient condition, can be analyzed using conventional statistical techniques, visualization techniques, and/or data mining algorithms/techniques. Statistical and data-mining analysis techniques may focus on targeted sets of genes, e.g., those that may vary in a well correlated manner, are under similar regulatory control, or may have consistent functional annotation or ontological categorizations. However, there may be additional information in the full data set which can remain unrecognized or be inadvertently discarded when using these techniques, and possibly contain a richer and more detailed picture.

Biological processes such as circadian rhythms, cell division, metabolism, and development can occur as ordered sequences of events. The synchronization of these coordinated events can be important for proper cell function, and thus the determination of significant time points in biological processes can be an important component of all (or substantially all) biological investigations. For example, such significant time points can establish logical ordering constraints on subprocesses, impose prerequisites on temporal regulation and spatial compartmentalization, and/or situate dynamic reorganization of functional elements in preparation for subsequent stages. Thus, building temporal phenomenological representations of biological processes from genome-wide datasets can be relevant in formulating biological hypotheses on, e.g., how such processes can be mechanistically regulated, how the regulations can vary on an evolutionary scale, and how inadvertent disregulation of such processes can lead to a diseased state or fatality.

Thus, there may be a need for methods, systems and software arrangements that are capable of providing global and dynamic perspectives on transcription states by combining quantitative analysis of data sets with formal models that can characterize various global phenomena, e.g., temporal evolution of biological processes or other sequential data patterns.

SUMMARY OF THE INVENTION

One of the objects of the present invention is to provide systems, methods, software arrangements, and computer-accessible media for reconstructing formal descriptive models of processes from data, e.g., functional and/or modal data using a particular ontology or a controlled vocabulary.

In one exemplary embodiment of the present invention, a set of data to be analyzed can be obtained, where the data may be heterogeneous and of diverse nature, e.g., functional, temporal or modal data. The data may be generated by a dynamical system, and may represent diverse phenomena of different nature, e.g., gene expressions, probe values, neural data, or clicks on web links. Alternatively or additionally, the data may be dependent on one or more modal parameters, e.g., time, dosage, or an environmental condition. The data may be provided in the form of a matrix.

The data may be organized into a plurality of states and state transitions between the states. For example, states may include clusters, possible worlds, etc., and state transitions may include persistence, causality, continuity, etc. This organization can be performed using conventional procedures, e.g., a clustering procedure employing a K-means technique, an SOM technique, an agglomerative technique, or a graph-based technique, a biclustering procedure, or an information-bottleneck-based procedure, etc.

In another exemplary embodiment of the present invention, each state may be annotated using one or more labels provided by a set of atomic propositions, e.g., a controlled vocabulary. The vocabulary can be provided through different analytical techniques, e.g., by an ontology, statistical text mining, etc. The model represented by a number of labeled states and associated state transitions may be referred to as a "Hidden Kripke Model." Such models can have the form of a conventional Kripke model, and/or may be described as "hidden" because the model is derived from the data itself using the controlled vocabulary or ontology. Conventional Kripke models, in contrast, can be formulated a priori based on some system knowledge, and then data can be fitted to the assumed model.

In a further exemplary embodiment of the present invention, a probability coefficient, or p-value, may be assigned to one or more states or clusters in the model. The p-values may be computed by a statistical analysis, e.g., applying a Fisher exact test, utilizing a Jacquard Coefficient, etc., and they may be sub-selected by a separate procedure, e.g., false-discovery rate ("FDR") criteria. These p-values can indicate the degree of likelihood that a given state and transition will conform to the generated model. A new model may optionally be generated based on a different organization of the data into states and state transitions, if the p-values for a generated model are not sufficiently large.

In a still further exemplary embodiment of the present invention, invariants may be extracted from the generated model, which can be a Kripke model. These invariants can provide additional insight into the dynamical system or phenomena that created or influenced the data. Extraction of invariants may be performed using a formal approach, e.g., using modal logic, fuzzy logic, or temporal logic such as, for example, linear-time or branching-time logic, etc., by combining the labels systematically, e.g., using model checking and/or iterative extension techniques. The generated model and associated invariants may be used to provide responses to user queries about the data set. This procedure can permit additional information to be obtained regarding relationships among the data, the nature of the underlying processes, and/or patterns that may be present in the dynamical and/or multivariate system that produced the data.

These and other objects, features and advantages of the present invention will become apparent upon reading the following detailed description of embodiments of the invention, when taken in conjunction with the appended claims.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 8B shows exemplary contingency tables 830 that capture the concerted grouping of genes within segments;

DETAILED DESCRIPTION OF EXEMPLARY EMBODIMENTS

Figure 1:
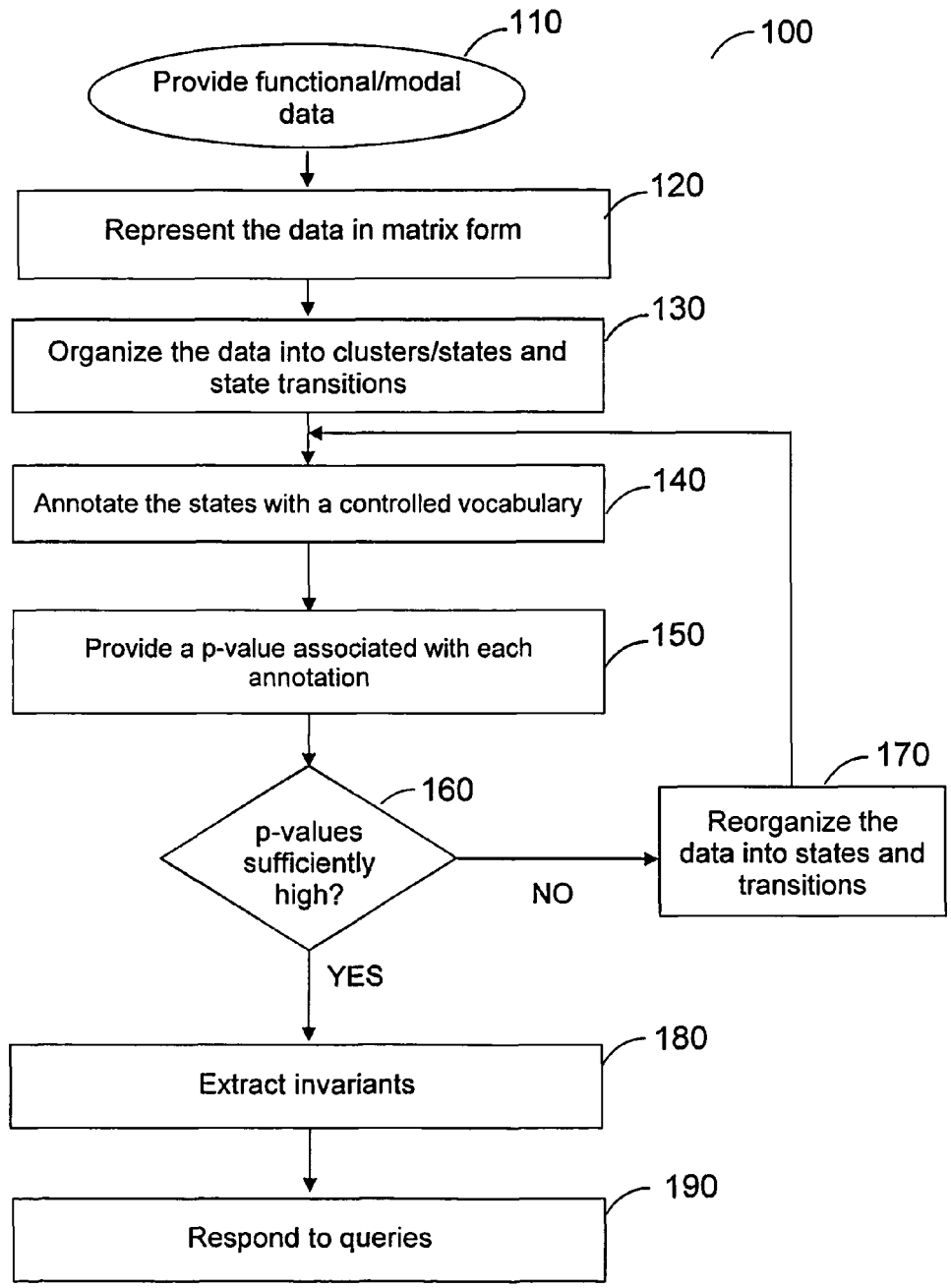
FIG. 1 is a general flow diagram of a certain exemplary embodiment of a method according to the present invention.

The method, system and software arrangement according to an exemplary embodiment of the present invention, collectively referred to herein as "GOALIE" (an acronym of "Gene Ontology Algorithmic Logic for Information Extraction"), can use a gene ontology ("GO") biological process taxonomy (or any other ontology or controlled vocabulary collection, e.g., MeSH, UMLS, etc.) to automatically extract temporal or other invariants from numerical data. The data may be organized modally, e.g., along time, concentration, dosage, or any other independent variable or combinations thereof. GOALIE is capable of integrating data-driven reasoning, e.g., analysis of time course data sets with model-building capabilities.

Conventional analysis techniques can require that a Kripke structure be pre-defined based on knowledge or assumptions about processes that are related to the data, and fitting of the data to the pre-defined structure. GOALIE can utilize and/or include an exemplary method for obtaining Kripke structures directly from data sets, e.g., time course micro-array data sets. Such "hidden" Kripke models ("HKM's), as described below, can be generated by combining concepts and techniques used in a redescription mining with "model checking" techniques, e.g., those used for systems biology. This exemplary approach can provide both global and dynamic perspectives of transcriptional states, in which properties of a dynamical system can be described using the vernacular of temporal logic.

A "hidden" Kripke model can include a set of hidden states or possible worlds, together with transitions among the states, where the states may be labeled with logical propositions. An HKM may appear to be a variation of the conventional Hidden Markov Model ("HMM") that may be used in the field of bioinformatics. However, it is likely that an HKM as described herein may have no readily observable emission alphabets. To generate an HKM, true logical propositions selected from a universe of discourse may be inferred or redescribed. For example, according to the exemplary methods of the present invention described herein, an HKM may be generated without assuming a particular system architecture a priori. The transitions associated with the HKM can be inferred from the structure and/or the semantics of the possible worlds or universes. When the HKM structure has been inferred, however, it can be utilized to identify invariants associated with the data set, e.g., predicting dynamical properties of unannotated genes or behavior of a cell, an organ or an organism at a system level under various environmental, physical, or other conditions.

To obtain the Kripke structure from a reachability graph, a set of atomic propositions ("AP") can be defined to denote the properties of individual states. For example, a proposition p may be defined as "cell size large enough for division." The proposition p may not be true in states M, G1(I), and G0, and it may become true in state G1(II). A vocabulary of propositions may be defined, and the state symbols (e.g., M, G1(I), etc.) may be replaced with the set of atomic propositions that apply to each state. Thus, P can represent a map from the set of states to the set of atomic propositions AP. The resulting labeled graph can represent the Kripke structure.

In accordance with certain exemplary embodiments of the present invention, redescriptions can be utilized to infer the Kripke structures. For example, the redescription can be based on a method combining one particular vocabulary with a particular modal data set, e.g., combining gene expression levels at specified time points or intervals with a particular vocabulary that may be related to an ontology, e.g., a GO biological process taxonomy. The redescription may be equivalent or substantially similar to labeling time-dependent expression clusters (e.g., the states) with atomic symbols based on GO categories (e.g., the propositions). To obtain state transitions, redescription can be performed again, where the second redescription involves connecting a pair of states, e.g., a state defined over one time slice to a state defined in a neighboring (e.g., a successive) time slice. Thus, descriptors defined in a propositional temporal logic can be utilized to perform redescriptions both within and across intervals of time. By combining these redescriptions into the Kripke structure or model, a global understanding of the temporal nature of the underlying processes can be obtained. This exemplary approach can integrate techniques using model-checking methods with a data-driven emphasis of redescription techniques as described herein.

GOALIE can be used to analyze a time-course biological micro-array experiment by first weighing time-points using a sliding-window. This weighing procedure can be performed using various algorithms, e.g., a Haar square weight function or a smoother function such as, e.g., a Gaussian distribution. This exemplary procedure may be similar in concept to a performance of a multi-frequency analysis of signals. The result of this set of instructions can be a set of data windows which may overlap. The data windows can then be clustered using one of several conventional procedures, e.g., a K-means technique.

Associations or redescriptions of each cluster in each window can then be constructed using a particular controlled vocabulary, e.g., ontological annotations for genes and proteins. Each cluster in each data window may be associated with one or more descriptive terms obtained from the controlled vocabulary (e.g., from the GO process taxonomy). This association can be achieved by performing data-dependent statistical tests. These exemplary tests can include many different approaches, e.g., a simple implication covering technique which may be based on conventional procedures such as Jacquard similarity, a Hypergeometric test, or a Fisher Exact Test.

Labeling of the clusters may also be performed using an empirical Bayes approach. Labeled clusters can then be "chased" to yield transitions to clusters in neighboring time windows. The basis for relating clusters across time windows may be the commonality of labelings as revealed by the previous procedure. The above stages can then be repeated, as needed, in an iterative fashion to refine the initial clusterings (e.g., in response to the identified state transitions) or to adjust the transitions (e.g., to reflect new cluster assignments). Since the propositions can be obtained from a controlled vocabulary, it may be possible to combine these propositions to create formulae in a propositional temporal logic (CTL), which may be useful in describing complex cellular dynamics.

Appropriate statistical corrections may also be employed in conjunction with these tests, e.g., applying a Bonferroni correction or a Benjamini-Hochberg correction, which may reduce a false discovery rate of inferred redescriptions. Such constructions can be applied to a fixed set of clusters using conventional techniques. Further, GOALIE is capable of coupling such techniques using a time-course analysis (or an analysis with respect to the course of another independent variable) of numerical data. This exemplary approach can thus provide information relating to correlations among processes occurring within, e.g., a biological or other dynamical system.

A set of graph relationships among data windows can then be generated based on associations among clusters and terms provided by the particular controlled vocabulary. This exemplary set of graph relationships can be used to construct exemplary temporal logic formulae describing the system (e.g., a biological system) at a phenomenological level. The construction of such graph can depend on the choice of the controlled vocabulary or ontology, the quality of the basic annotations available (e.g., the annotation of a specific gene product with a number of terms), and/or the quality of the statistical tests used in the previous procedure of constructing associations or redescriptions of each cluster.

The number of the clusters, and therefore the number of associations and/or redescriptions between controlled vocabulary terms and clusters, can then be optimized by performing an exemplary optimization procedure on the data, whereas the routine may be formulated in terms of an information bottleneck problem. An objective function can be generated by combining several mutual information factors denoting interdependencies between data and ontology, e.g., in a biological analysis they can be gene products and controlled vocabulary terms. This procedure can improve and/or maximize the consistency of inter-window associations (e.g., redescriptions) between sets of terms and clusters in each data window. They can be useful because the information bottleneck formulation can be expressed in terms of opposing constraints. This optimization routine can be analogous to competitive learning procedures and unsupervised techniques that cluster in a primary space using information from an auxiliary space.

The set of graph relationships can then be organized in a directed acyclic graph ("DAG"), and circularities may be re-introduced using a wrapping technique. An edge can be placed between a cluster in a window and another cluster in a previous or successor window. Each edge may be tagged with the terms that (i) are shared between the redescriptions of the two clusters and/or (ii) are associated only in the first cluster, and the terms that are associated only to the second cluster. The set of temporal logic sentences may be reconstructed by analyzing different "chains" of edges in the DAG. For example, finding a set of terms that appear in each edge of a chain from the initial window to the last window can generate a particular temporal logic sentence, likely denoting the invariance of the set of terms.

An exemplary flow diagram of a method 100 according to an exemplary embodiment of the present invention is shown in FIG. 1. For example, data to be analyzed can be received (step 110), where the data may be, e.g., functional, temporal or modal. The data may be generated by different mechanisms, e.g., a number of sensors measuring important variables, e.g., gene expressions, probe values, neural data, or clicks on web links. Alternatively or additionally, the data may be dependent on one or more parameters, e.g., time, dosage, or a condition variable. Such data may be provided as a matrix (step 120), where each row can represent an index of the sensors, and each column can represent a modal variable.

A "Hidden Kripke Model" may then be constructed by organizing the matrix of data into states and state transitions (step 130). For example, the states may include clusters, possible worlds, etc., and the state transitions may include any one or more of many important binary relations, e.g., persistence, causality, continuity, etc. The model construction can be performed using a conventional procedure, e.g., a clustering procedure employing a K-means technique, an SOM technique, an agglomerative technique, or a graph-based technique, a biclustering procedure, and/or an information-bottleneck-based procedure, etc.

The states may then be annotated or labeled using the particular controlled vocabulary (step 140). The vocabulary can be provided, e.g., by an ontology, statistical text mining, etc. A p-value may then be assigned to each label or annotation (step 150). The p-values may be determined by a statistical analysis, e.g., applying a Fisher exact test, utilizing a Jacquard Coefficient, etc., and they may be sub-selected using additional statistical criteria, e.g., false-discovery rate ("FDR") criteria. The p-values may optionally be assessed to determine if they are greater than a predetermined value, or if they are sufficiently high for the desired application (step 160). If the p-values are not sufficiently large, the data may be rearranged into the different states and state transitions (step 170). This can be performed using different criteria for identifying the states and transitions than were used previously. The rearranged states and transitions may then be again annotated (step 140).

After the states are annotated (step 140) and provided with p-values (step 150), invariants of the resulting Kripke structure may be extracted (step 180). The extraction of invariants may be performed using a formal method, e.g., modal logic, temporal logic such as, for example, linear-time or branching-time logic, fuzzy logic, etc., by combining the labeled annotations algorithmically, e.g., using model checking and/or iterative extension techniques. The Kripke model and the associated invariants may be used to generate responses to user queries (step 190). This exemplary procedure can permit additional information to be obtained regarding the relationships among the data and the nature of the underlying processes or patterns that may be present in the dynamical or multivariate system, which produced the data.

EXAMPLE

Certain exemplary embodiments of the method, system and software arrangement according to the present invention have been used to analyze a yeast cell cycle data set described in Spellman et al., (see Spellman, P., et al., *Comprehensive Identification of Cell Cycle Regulated Genes of the Yeast Saccharomyces Cerevisiae by Microarray Hybridization*, Molecular Biology of the Cell, 9(12), pp. 3273-3297, December (1998)). Analysis of this exemplary data using an exemplary embodiment of the present description is described in Ramakrishnan et al., *Reconstructing Formal Temporal Models of Cellular Events using the GO Process Ontology*, Bio-Ontologies SIG Meeting, ISMB 2005, Detroit, U.S.A. (2005).

For example, the data set includes several time course microarray measurements of gene expression levels under a number of cell synchronization treatments (e.g., α-factor, Cdc15, and elutriation treatments). An analysis was performed on a data set prepared from the α-factor time course data using the full set of more than 6000 genes in accordance with exemplary embodiments of the present invention.

The α-factor time course data was partitioned into windows containing four time points each, yielding eight windows. Each window was partitioned into 15 clusters, resulting in a total of 120 clusters. The 120 clusters were redescribed using a p-value of 0.05. The redescriptions across the windows were then computed using a stringent Jaccard's coefficient θ=0.8.

Figure 2:
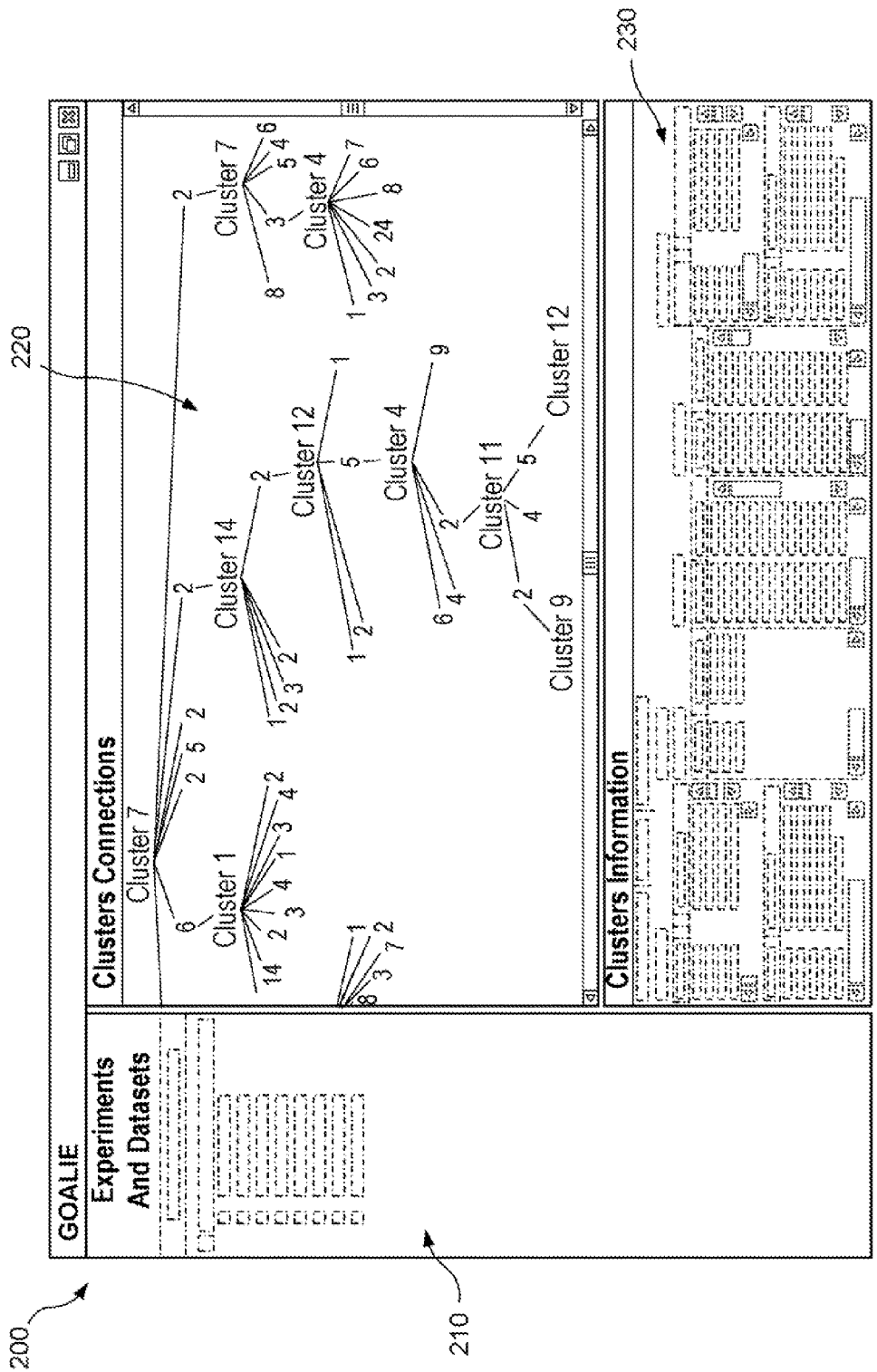
FIG. 2 is an illustration of a display of an exemplary output of an exemplary embodiment of systems and/or software arrangements in accordance with the present invention.

FIG. 2 shows an exemplary display (e.g., a screen shot 200) of another exemplary embodiment of the system and software arrangement (GOALIE) in accordance with the present invention. In particular, a left portion 210 of the screen shot 200 depicts various time slices utilized in the exemplary data analysis. A top right portion 220 of the screen shot 200 depicts an image of a cluster connections graph that may be used for an interactive exploration of the data using redescriptions. A bottom right portion 230 of the screen shot 200 identifies exemplary propositions that remain true, propositions that become true, and exemplary propositions that cease to be true when going from a source cluster to a destination cluster.

Figure 3:
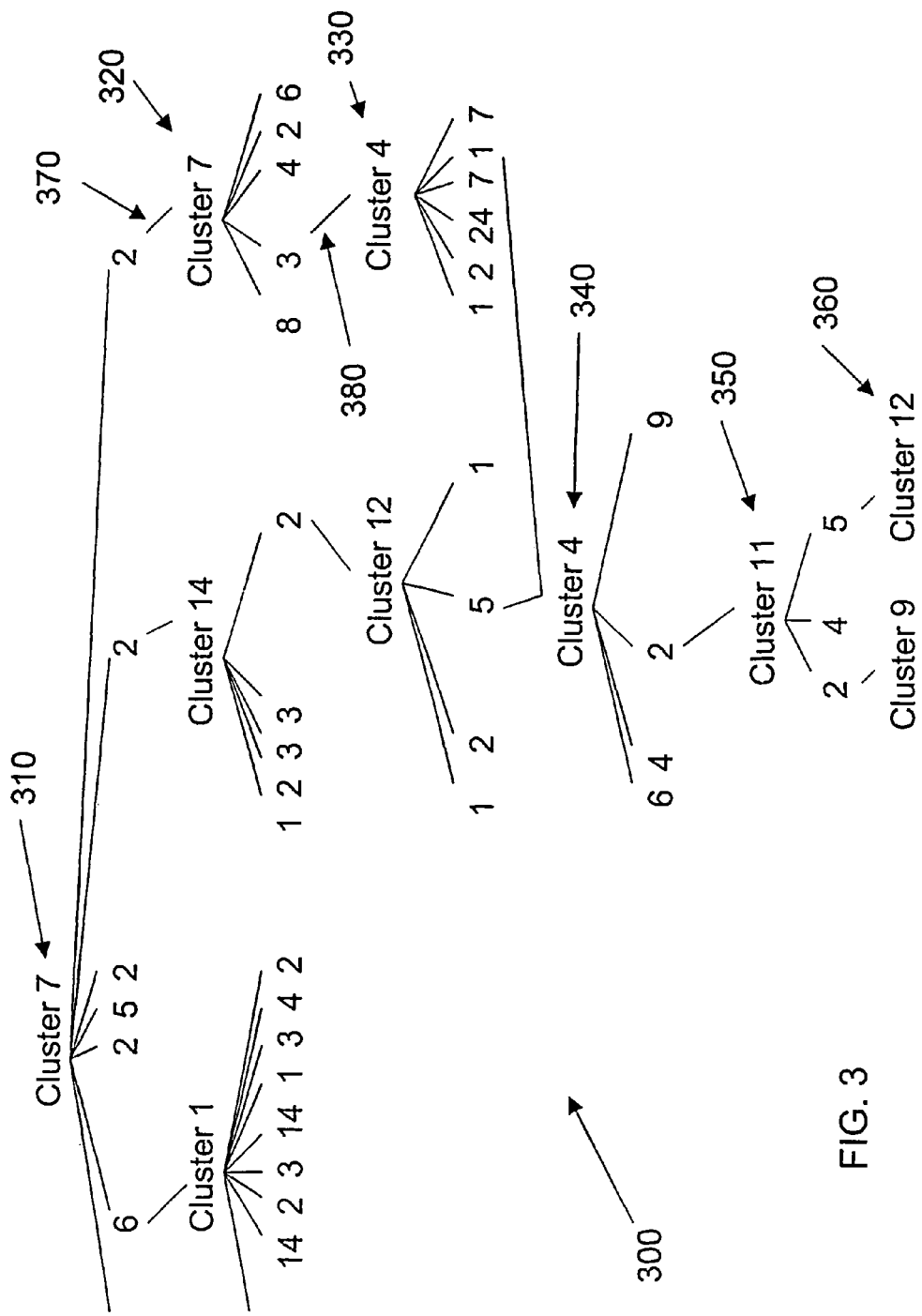
FIG. 3 is an illustration of an exemplary diagram showing sample states and state transitions.

A representation of the cluster connection graph 220 of FIG. 2 is shown in FIG. 3. In this exemplary graph, Cluster 7 (310) in the first window has been "chased" to yield a chain through successive time windows that includes Clusters 7 (320), Cluster 4 (330), Cluster 4 (340), Cluster 11 (350), and Cluster 12 (360), respectively. The links between the clusters are labeled with the cardinality of the GO terms they have in common. For example, the first edge 370 in this chain involves 2 common GO terms, the second edge 380 involves 3 common GO terms, etc.

Figure 4:
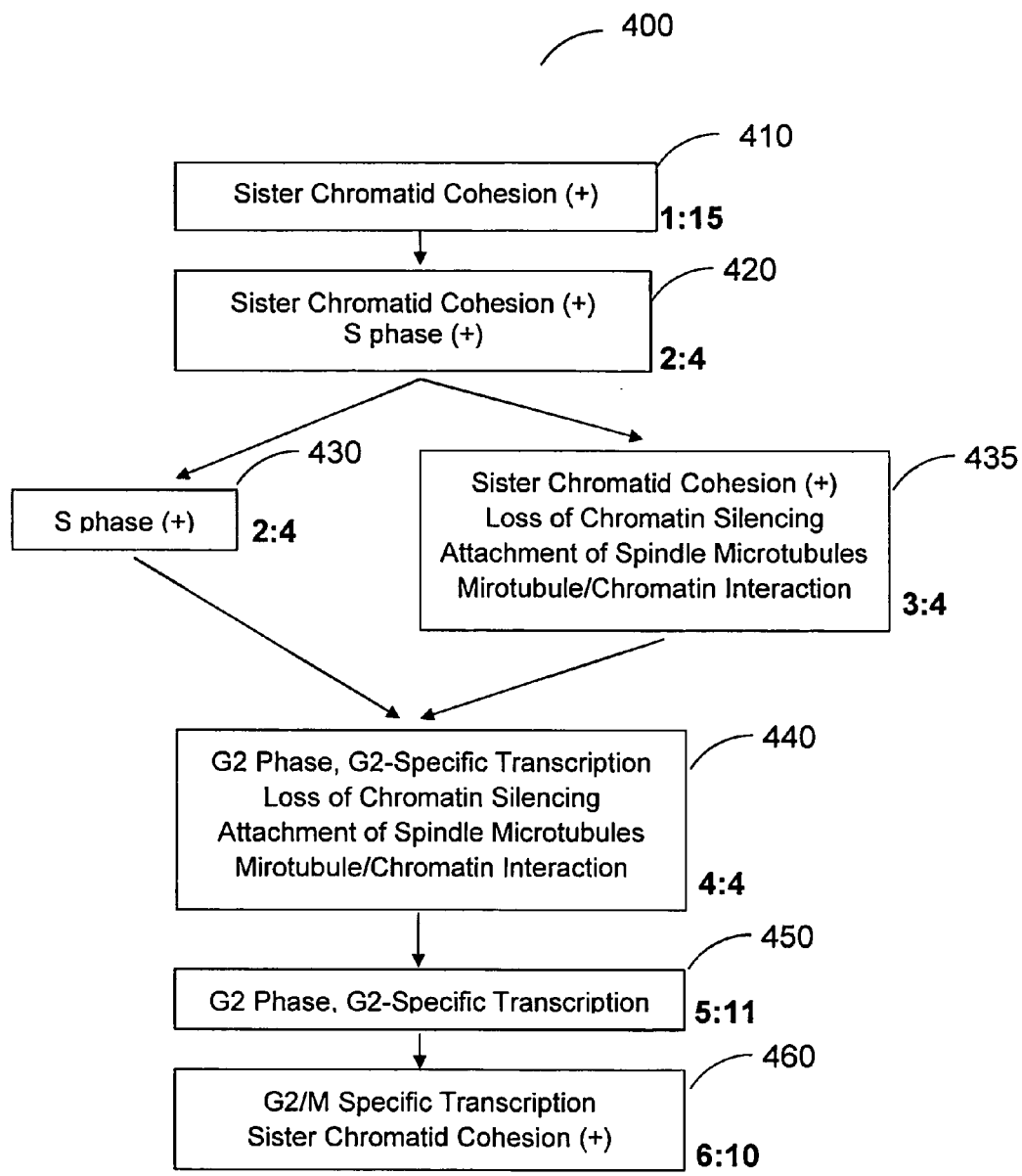
FIG. 4 is an exemplary Kripke diagram that may be generated in accordance with a further exemplary embodiment of the present invention.

An exemplary Kripke diagram 400 derived from the yeast cell cycle data set described in Spellman et al. (see Spellman et al., supra.) using the exemplary embodiments of the method, system and software arrangement according to the present invention is shown in FIG. 4. The derivation of this exemplary Kripke diagram 400, which can be obtained using the information provided by GOALIE similar to that shown in FIG. 2, is described hereinbelow. In the following descriptions, the notation: "Cluster~L:N," with L and N representing positive integers, can be understood to refer to Cluster N in time course window L.

Time Course Window 1 to Time Course Window 2: Connection 1:15 to 2:4.

For example, referring to FIG. 4, the inspection of a first cluster 410 in a first window (e.g., Cluster~1:15) may indicate that there is only one connection which is worth following to a cluster 420 in a second window (e.g., Cluster~2:4). The criteria for this choice can be that an edge connecting the two clusters 410, 420 is labeled (among many others) by, e.g., the GO categories 'positive regulation of sister chromatid cohesion' (GO:0045876), and that Cluster~2:4 420 is labeled by, e.g., the category 'regulation of S phase of mitotic cell cycle' (GO:0007090), i.e., Cluster~2:4 420 becomes activated in a second time course window.

Time Course Window 2 to Time Course Window 3: Connection 2:4 to 3:2.

Next, Cluster~2:4 420 may be reviewed in a second time-course window. There are two connections that can be followed to time-course window 3, a connection to Cluster~3:2 430 and a connection to Cluster~3:4 435. The GO category 'regulation of S phase of mitotic cell cycle' (GO:0007090) is maintained across the connection to Cluster~3:2 430, while the category 'positive regulation of sister chromatid cohesion' (GO:0045876) becomes inactive.

Time Course Window 3 to Time Course Window 4: Connection 3:2 to 4:4.

A subsequent connection in this chain of states may indicate that the GO categories 'G2 phase of mitotic cell cycle' (GO:0000085), 'G2-specific transcription in mitotic cell cycle' (GO:0000116), 'microtubule/chromatin interaction' (GO:008546), and 'attachment of spindle microtubules to kinetochore' (GO:008608) can each become active in Cluster~4:4 440.

Time Course Window 4 to Time Course Window 5: Connection 4:4 to 5:11.

Based on analysis of the yeast data by GOALIE, this exemplary connection may be the only significant connection between time windows 4 and 5. The GO categories 'G2 phase of mitotic cell cycle' (GO:0000085), and 'G2-specific transcription in mitotic cell cycle' (GO:0000116) remain active in Cluster~5:11 450, while the two categories 'microtubule/chromatin interaction' (GO:008546), and "attachment of spindle microtubules to kinetochore" (GO:008608) can become inactive.

Time Course Window 5 to Time Course Window 6: Connection 5:11 to 6:10.

In this next procedure, the G2 related categories may become inactive, while M phase related activities may be initiated in Cluster~6:10 460. For example, the GO categories 'G2 phase of mitotic cell cycle' (GO:0000085) and 'G2-specific transcription in mitotic cell cycle' (GO:0000116) can become inactive. The GO categories 'G2/M-specific transcription in mitotic cell cycle' (GO:0000117) and 'positive regulation of sister chromatid cohesion' (GO:0045876) become active.

Following the exemplary sequential chains downward Cluster~6:10 460, connections that exhibit an expected transition from G2 to M phases can be located, e.g., in transition from Time Course Window 7 to Time Course Window 8, Connection 7:11 to 8:12. These clusters are not shown in FIG. 4.

GOALIE may have all pre-processed information available to automatically generate, e.g., two temporal logic formulae. The first formula may indicate that there can exist a directed path connecting a sequence of clusters in successive time windows such that the GO category "sister chromatid cohesion" holds until the cell enters G2 phase. The second formula may indicate, e.g., that 'the cell, after dwelling in G2 phase, enters M phase.' This feature may be generally recognized as a property of a cell cycle. However, this result is derived automatically, as described herein, from numerical expression matrices and a static ontological annotation.

Further, GOALIE can incorporate conventional query-based model checking techniques that can be used by a user, e.g., a biologist to formulate a Natural Language ("NL") query or a query formulated in a temporal logic language (e.g., CTL) about the temporal evolution of the exemplary system.

The invariants may be extracted from the DAG of cluster relationships. Translating such formulae into a NL form can be simplified by using exemplary embodiments of the present invention. For example, the following examples illustrate two exemplary invariants that may be derived from the exemplary analysis of gene data described hereinabove:

Exists_path('sister chromatid cohesion'
Until ('G2 phase' And ' G2 specific transcription'))
Eventually(Exists_path(('G2 phase' And ' G2 specific transcription')
Until 'G2/M specific transcription'))

The exemplary embodiments of the methods according to the present invention described herein may be used with various types of data and different controlled vocabularies and/or ontologies. For example, in addition to biological applications, the systems, methods and software arrangements in accordance with exemplary embodiments of the present invention may be used to describe and understand data relating to various fields of application, e.g., consumer purchasing patterns, vehicular traffic patterns, and the like. The exemplary embodiments of the present invention may also have biological applications to drug-or-vaccine discovery, understanding behavior of a cell in an altered diseased state (e.g., cancer, neuro-degeneration or auto-immune disease), genetically modifying a natural wild-type organism, genetic-engineering, etc. Other exemplary applications may include providing improved understanding of such phenomena as neural behavior, market behavior of a population of users interacting on the Internet, etc.

Figure 5:
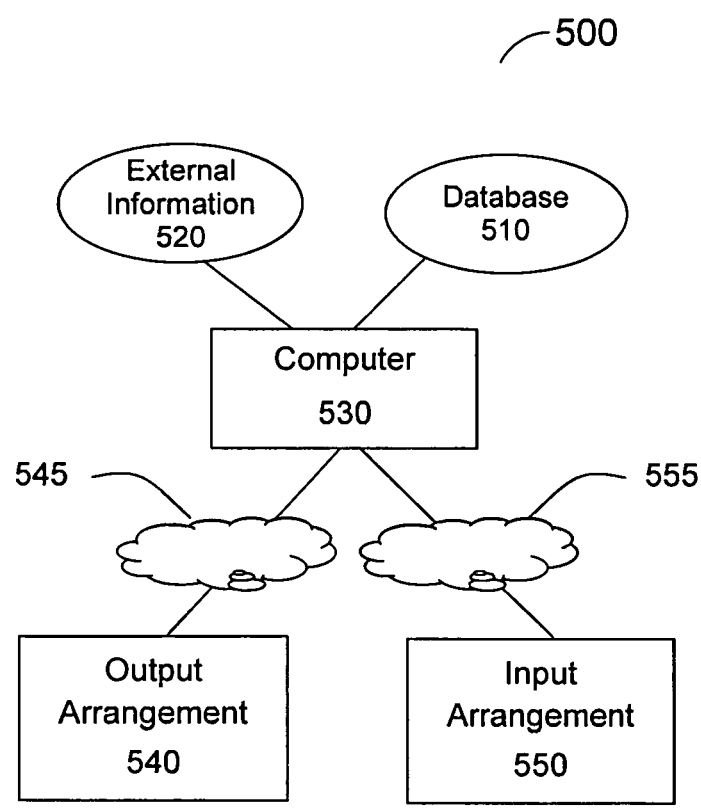
FIG. 5 is a schematic diagram of the system in accordance with a certain exemplary embodiment of the present invention.

An exemplary embodiment of a system 500 for implementing the present invention is shown in FIG. 5. For example, a database 510 of the system 500 may contain one or more sets of data to be analyzed. The system 500 may further store, obtain and/or utilize external information 520 which can include, e.g., one or more controlled vocabularies, as well as exemplary procedures that may be used, e.g., to perform one or more steps required to construct hidden Kripke models, generate p-values, etc. The external information 520 and information contained in the database 510 can be communicated to a computer 530. The computer 530 may comprise a hardware processing arrangement and/or processor, and may be configurable, e.g., to represent the data in matrix form, organize the data into states and state transitions, annotate or label states, generate p-values associated with the various states, generate Kripke models based on the data, extract invariants associated with the Kripke model, and/or perform other computational and/or data handling procedures.

Information relating to the data sets may be communicated to an optional output arrangement 540. The output arrangement 540 may include any suitable display device, including but not limited to a display, a video monitor, a printer, a data storage medium, and the like. The output arrangement 540 can be in communication with the computer 530 using an output connection 545, which can include a wireless connection, a wired connection, a signal communication line, a local area network, a wide area network, a connection to the Internet, etc.

The system 500 may further comprise an input arrangement 550, which can include any suitable input device capable of providing signals to the computer 530. The input arrangement 550 can include, but is not limited to, a mouse, a keyboard, a touch screen, a pointing device, and the like. The input arrangement 550 can be in communication with the computer 530 using an input connection 555, which may include, e.g., a wireless connection, a wired connection, a signal communication line, a local area network, a wide area network, a connection to the Internet, etc. The input arrangement 550 can be used, e.g., to specify data sets and/or controlled vocabularies to be used, and/or queries to be processed based on a generated Kripke structure. The computer 530 can include a hard drive, CD ROM, RAM, and/or other storage devices or media which computer-accessible medium can include thereon software, which can be configured to execute the exemplary embodiments of the method/procedure and software arrangement of the present invention.

Further provided and described herein is an exemplary framework that can be used to, e.g., reconstruct temporal models of cellular processes from time-course gene expression data. For example, it is possible to combine multiple time-course datasets to reveal groups of critical genes that can alter orchestrated processes in the cell. As described herein, this exemplary problem can be mathematically formulated as, e.g., optimally (or based on meeting certain pre-determined criteria) segmenting multiple datasets into a succession of "informative" windows such that time points within a window can expose concerted clusters of gene action whereas time points straddling window boundaries can constitute points of significant restructuring. For example, provided herein is a description of how exemplary embodiments according to the present disclosure can successfully bring out and/or involve an interplay (and/or interdependence, association with, bilateral utilization, etc.) between multiple yeast processes, as can be inferred from combined datasets for the cell cycle and the metabolic cycle, which datasets can be experimental and/or obtained based on pre-selected criteria.

Cells and organisms can be viewed as progressing through sequences of states, as a result of discrete mechanisms. Defining these states and identifying the underlying mechanisms can be important to, e.g., understanding biological processes and how metabolic and developmental disorders can be treated. Exemplary analysis systems and tools can be based on and/or utilize algorithms, procedures and/or methods for time series analysis using temporal logic formalisms and can be used with engineering, and computer and systems science applications, for example.

For example, the yeast species *Saccharomyces cerevisiae*, which has been likely researched and studied to understand the biology of eukaryotic microorganisms, can be a good model organism to illustrate some of the exemplary embodiments of the present disclosure as described herein. To understand the systems biology of yeast, it is possible to study temporal expression profiles of genes involved in a particular function, e.g., cellular division or metabolism, and create models of the state space dynamics in terms of labeled states and state transition relations.

Figure 6:
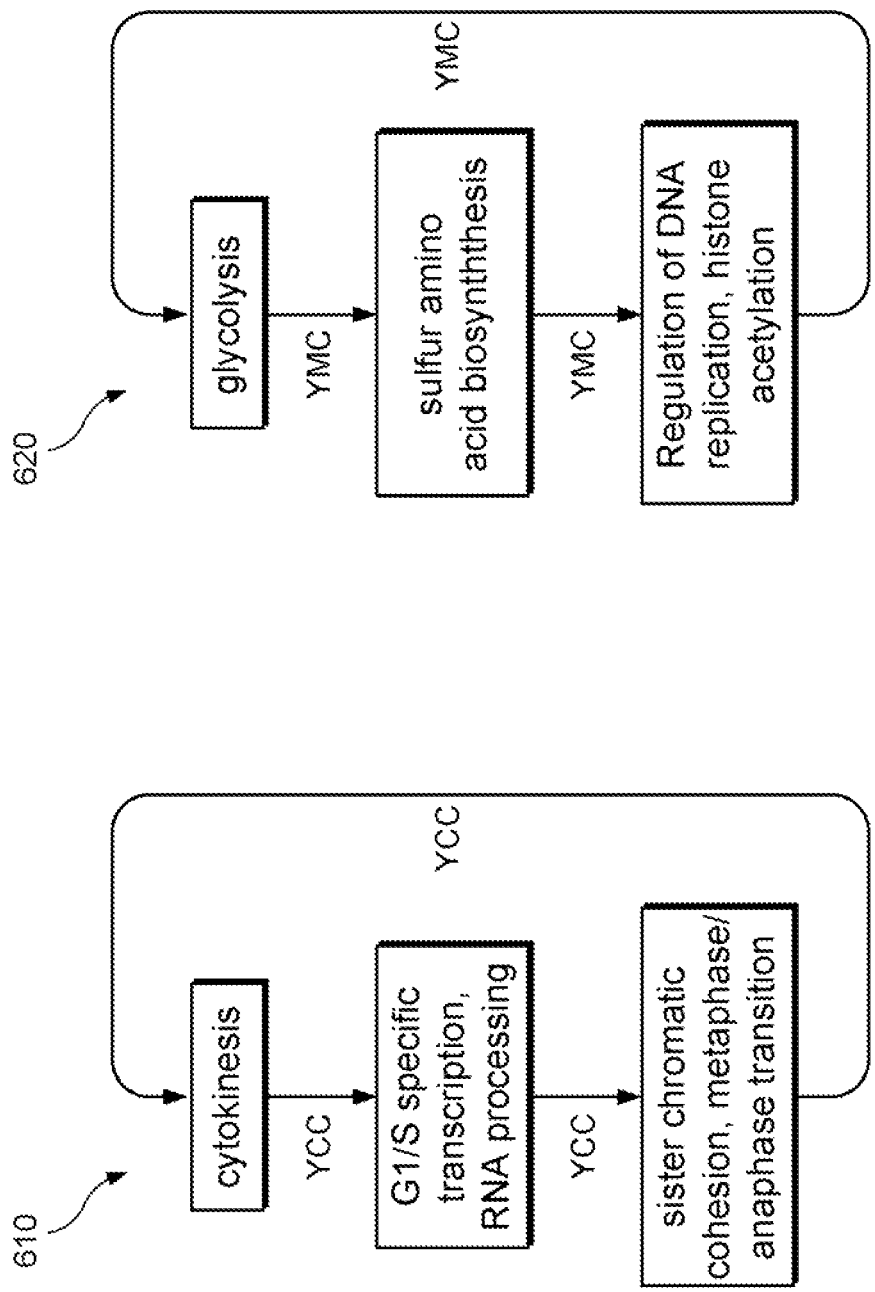
FIG. 6A is a schematic diagram illustrating an exemplary procedure according to the present disclosure.
FIG. 6B is schematic diagram illustrating an another exemplary procedure according to the present disclosure.

For example, FIGS. 6A and 6B illustrate a procedure according to an exemplary embodiment of the present disclosure. As shown in these FIG. 6A, a yeast cell cycle (YCC) model 610 can be created using data generated by a procedure such as described in Spellman et al. (see Spellman et al., supra.). Similarly, as shown in FIG. 6B, a yeast metabolic cycle (YMC) model 620 can be created by combining data generated separately by two other research groups, such as the groups described in Tu et al. (see Tu, B., Kudlicki, A., Rowicka, M. and McKnight, S., *Logic of the yeast metabolic cycle: temporal compartmentalization of cellular processes*, Science 310:1152-1158 (2005)) and Klevecz et al. (see Klevecz, R., Bolen, J., Forrest, G. and Murray, D. B., *A genomewide oscillation in transcription gates DNA replication and cell cycle*, Proc Nat'l Acad Sci USA 101:1200-1205 (2004)). Resulting exemplary YCC and YMC labeled state transition models 610, 620 are shown in FIGS. 6A and 6B, respectively. States can be identified through an exemplary segmentation procedure according to above-identified application, and edges can be labeled by the experimental conditions under which the transitions are observed.

It is possible to view these two exemplary models 610, 620 as Kripke structures (see, e.g., Clarke, E., Grumberg, O. and Peled, D., *Model Checking*, MIT Press (1999)), with atomic propositional labels corresponding to the GO functional categories, thereby enabling temporal logic model-checking to extract complex global properties of these modules. For example, it can be ascertained from the Kripke structure of the cell cycle that for cytokinesis to lead to DNA replication, it is possible that the cell size must have enlarged sufficiently for division.

One exemplary goal of this type of analysis can be to formulate models without preexisting hypotheses, and to predict, e.g., how a system can be expected to behave when subjected to multiple perturbations. Due to the multitude of possible perturbations that can be imposed, it can be difficult to conduct experiments corresponding to each of them and/or require undue experimentation to obtain meaningful results or reliable information. Therefore, computational capabilities that can provide information on interactions and/or associations between individual subsystems can become important for obtaining such results.

Figure 7:
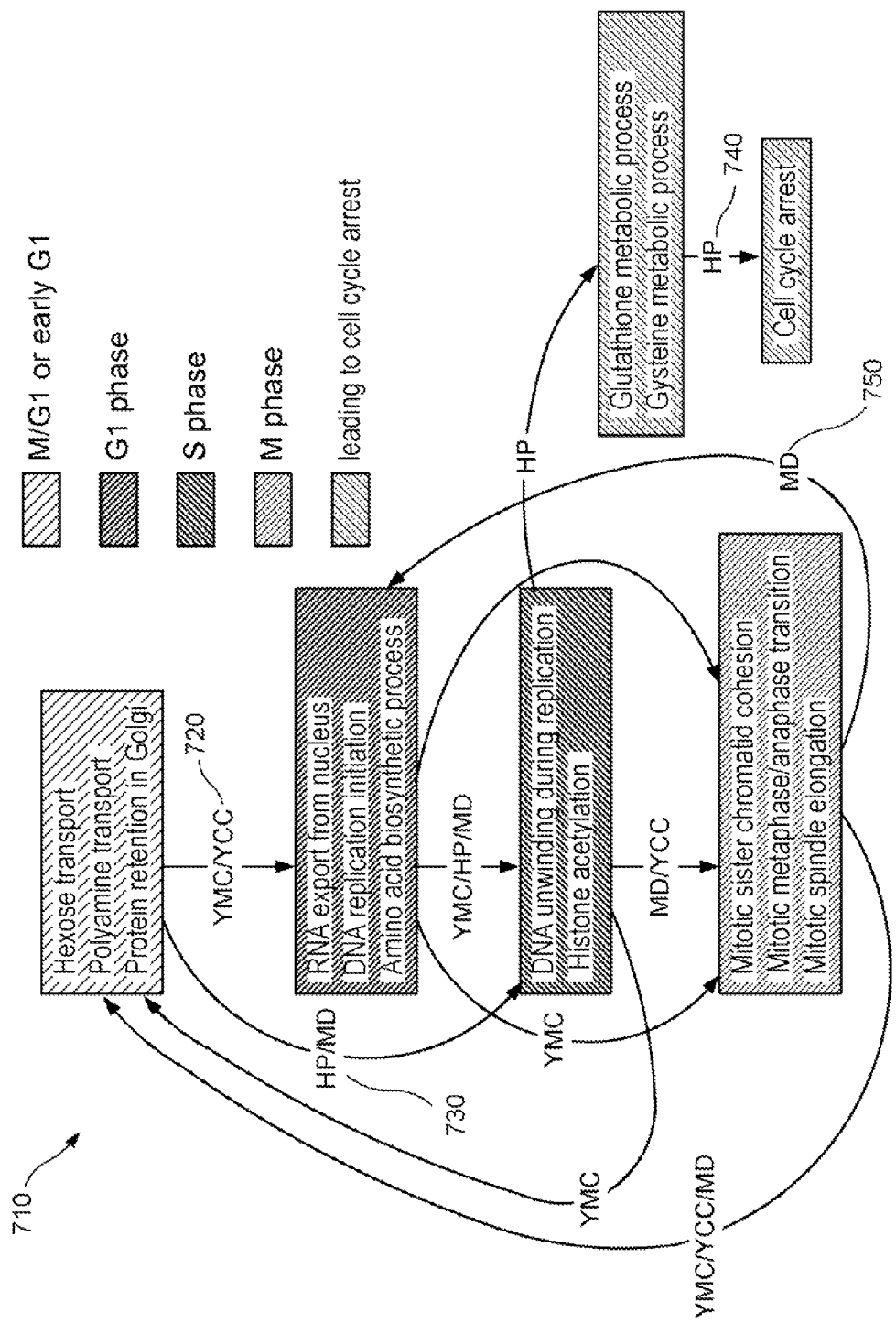
FIG. 7 a schematic diagram illustrating an exemplary combined temporal process model.

FIG. 7 shows an exemplary illustration of a combined temporal process model 710 of exemplary YCC and YMC experiments/studies. An exemplary approach and procedure according to the present disclosure, as shown in FIG. 7, is provided to computationally integrate data from the distinct YCC and YMC experiments/studies 720 along with data from other perturbations 730, e.g., by hydrogen peroxide (HP) or menadione (MD) treatments, into a more complex combined model. Such exemplary integration can be possible even though the data sources for each experiment/study and perturbation can be gathered independently. The combined exemplary model 710, which can be created by this exemplary metaanalysis, can reveal insightful and complex temporal properties of the combined exemplary system, which can not be visible in the individual component models. For example, the exit from cell cycle under HP perturbation 740 can be inferred as fundamentally different from the exit from cell cycle under MD treatment 750, in which under MD treatment, the cells complete one full cycle before being arrested.

To generate Kripke structure models as shown in FIG. 7, it is possible to use exemplary algorithms, procedures and/or methods to extract states and state transitions from the data, and subsequently to label the states. As provided and described herein, the exemplary mathematically rigorous procedure/method (GOALIE) can reconstruct temporal models of cellular processes from time-course gene expression data.

Exemplary Inference of Temporal Models.

As the exemplary procedure, method and/or system to infer temporal models, exemplary embodiments of GOALIE can be utilized by an experimentalist to, e.g., track which genes are under coordinated temporal regulation and how such gene expression can persist and dynamically vary over time, thereby providing information and insight into the progression of events constituting a given process. GOALIE can be based on and/or use an efficient dynamic programming algorithm, procedure and/or method utilizing an information-theoretic optimization criterion, for example.

Time-course analysis can be an important tool for the study of organism development, disease progression, and cyclical biological processes, e.g., the cell cycle, metabolic cycle, and even entire life cycles. The growing affordability of transcriptional profiling screens has likely fostered the generation of multiple time series datasets. When the number of time points is sufficiently large, researchers can utilize continuous representations to smooth out noise, apply hidden Markov models to guide clustering, and use static measurements to "fill in the gaps" in the time series data. When the number of time points is small, it is possible to study the role of sampling rates and propose the use of model profiles to guide clustering. Researchers also can characterize periodicity in transcriptional profiles, quantify timing differences in gene expression, extract binary signals embedded in the data, and reconstruct regulatory relationships.

One of the attractions of time series analysis can be its potential to reveal temporal relationships underlying biological processes, e.g., which process can occur before a particular event, what "checkpoints" can need to be satisfied (and when), and whether there can be alternative pathways of time series progression. Certain temporal modeling formalisms can be utilized, such as linear time logic, which can use a single time line from start to end, and branching time logics, which can allow for multiple possibilities. For example, as described herein, exemplary embodiments of the present disclosure can utilize linear time logics for modeling individual experimental conditions (stresses) yielding Gantt chart representations (as shown in the FIG. 9 and described herein below). The interplay between the stresses and potential branching behavior can then be inferred indirectly through concurrent notations such as Kripke diagrams. It is also possible according to certain exemplary embodiments of the present disclosure to directly model branching time behavior using data mining techniques, for example.

Exemplary embodiments of linear time modeling according to the present disclosure can function as follows. For example, given gene expression time-course data, it is possible to identify segments of the time course where, within a segment, genes organize into groups depicting concerted behavior but across segments there can be a significant regrouping of genes. Although such exemplary analysis can be conducted by tracking individual genes whose function is known, according to certain exemplary embodiments of the present disclosure, it is possible to automatically mine, in an unsupervised manner, temporal relationships involving groups of genes which are not a priori defined. Similarly, while there can be a desire for research into modeling the activity level of genes as a mixture model of activity levels of processes, such research is likely not directly concerned with revealing the temporal coordination of processes, such as described herein.

For example, biclustering algorithms can reveal patterns that can preserve order of the time course, but such biclusters can not yield a partition of the entire time course, such as can be achieved in accordance with certain exemplary embodiments of the present disclosure. Additionally, such previously described biclusters can tend to not cover all time points, can involve overlapping time points, and therefore cannot be easily post-processed into a formal temporal model, for example. Exemplary embodiments according to the present disclosure can derive a complete (or substantially complete) segmentation from which it is possible to construct state model where the states (nodes) correspond to the segments and transitions (edges) denote observed state-state boundaries, which state model can be finite. Furthermore, according to certain exemplary embodiments of the present disclosure, propositions that hold true in each state (e.g., the biological processes enriched in the corresponding segment) can be used to label the corresponding node in the model. Exemplary models from multiple stresses can then be combined by coalescing nodes and factoring transitions.

Exemplary Information-Theoretic Framework.

A core problem that can be solved by exemplary embodiments according to the present disclosure can be the segmentation of a given time-course dataset into a succession of "informative" windows such that time points within a window can reveal concerted clusters of gene action, whereas time points straddling window boundaries can indicate significant process-level restructuring. There are various mathematical formalisms that can be utilized by exemplary embodiments according to the present disclosure to formulate the segmentation problem and to characterize its solution. For example, as described herein, exemplary embodiments according to the present disclosure can use a framework based on information theory where the segmentation criterion is driven by measures over cluster dynamics.

For example, given multiple vectors of measurements $\mathcal{G} = \{g_1, g_2, \ldots, g_N\}$, where each $g_i$ is a time series over $\mathcal{T} = \{t_1, t_2, \ldots, t_l\}$, the problem of segmentation can be to find a sequence of segments, $(w_{t_1}^{t_a}, w_{t_{a+1}}^{t_b}, \ldots, w_{t_k}^{t_l})$ where each segment $w_{t_s}^{t_e}$, $t_s \le t_e$ can be a set of consecutive time points beginning at time point $t_s$ and ending at time point $t_e$. The segment boundaries can be identified such that, if genes in neighboring windows were to be clustered separately, highly dissimilar sets of clusters would likely be found. Considering the case of segmentation into two windows: e.g., where it is sought to find segments $w_{t_a}^{t_b}$ and $w_{t_{b+1}}^{t_c}$, with r clusters in the window $w_{t_a}^{t_b}$ and c clusters in the window $w_{t_{b+1}}^{t_c}$. It is possible to let $\alpha$ and $\beta$ represent the cluster random variables for the windows $w_{t_a}^{t_b}$ and $w_{t_{b+1}}^{t_c}$ respectively. In this exemplary case, the set of possible values for $\alpha$ can be $(1, \ldots, r)$, and the set of possible values for $\beta$ can be $\{1, \ldots, c\}$.

In order to relate two probability distributions, it is possible to begin with the idea of entropy (information) and relative entropy (conditional information). For example, $H(X) = -\Sigma p(x)\log_2 p(x)$ can be the entropy of a probability mass function $p(x)$ for X, and $H(X|Y) = -\Sigma p(x, y)\log_2 p(x|y)$ can be the conditional entropy given by a conditional probability mass function $p(x|y)$ for X with respect to Y. Accordingly, it is possible to obtain $$H(X) - H(X \mid Y) = -\Sigma p(x, y)\log_2\left(\frac{p(x) \cdot p(y)}{p(x, y)}\right).$$

If there is not enough regulatory reorganization between two consecutive time intervals, it is possible to gain a substantial amount of new information in the subsequent time window, provided that the dynamics in the preceding time window have already been analyzed and etiolated therefrom. Such exemplary procedures and concepts according to the present disclosure can be summarized in a notion of mutual information and lead to formulation of an exemplary optimization problem.

The mutual information between the two exemplary probability distributions for $\alpha$ and $\beta$ can provide a measure of similarity between the two clusterings in adjacent windows, as can be expressed by:

$$I(\alpha, \beta) = H(\alpha) - H(\alpha \mid \beta) \quad [1]$$
$$= H(\beta) - H(\beta \mid \alpha). \quad [2]$$

Since it can be desirable that the clusterings be highly dissimilar with as little mutual information as possible, the problem can be to minimize:

$$2I(\alpha,\beta) = H(\alpha) + H(\beta) + H(\beta) - H(\alpha|\beta) - H(\beta|\alpha). \quad [3]$$

Terms $H(\alpha)$ and $H(\beta)$ in the above equation can be ignored as these terms can just influence the cluster sizes. Thus, it is possible to focus only on the conditional entropies and use contingency tables to calculate the distributions as described herein.

According to certain exemplary embodiments of the present disclosure, it is possible to start by measuring the similarity of the clusters across the windows using a r×c contingency table. Entry $n_{ij}$ in the $(i,j)^{th}$ cell of the table can represent the overlap between the genes clustered together in cluster i of window $w_{t_a}^{t_b}$ and in cluster j of window $w_{t_{b+1}}^{t_c}$. The sizes of the clusters in $w_{t_{b+1}}^{t_c}$ can be provided by the column-wise sums across each row: $n_{i\cdot} = \Sigma_j n_{ij}$, while the sizes of clusters in $w_{t_{b+1}}^{t_c}$ can be provided by row-wise sums down each column: $n_{\cdot j} = \Sigma_i n_{ij}$.

Interpreting each row and column as a probability distribution, preferred highly dissimilar clusters can result in a total of (r+c) uniform distributions across the rows and columns of the exemplary contingency table. To capture the deviation of these distributions from the uniform distribution, it is possible to define r random variables $R_i$, $i=1, \ldots, r$ occurring with probability $$p_{R_i}(j) = \frac{n_{ij}}{n_{i\cdot}}$$

corresponding to each row. Similarly, it is possible to define c random variables $C_j$, $j=1, \ldots, c$ occurring with probability $$p_{C_j}(i) = \frac{n_{ij}}{n_{\cdot j}}$$

corresponding to each column. The deviation of these distributions can then be captured from the uniform distributions over the rows $$\left(U\left(\frac{1}{c}\right)\right)$$

and columns $$\left(U\left(\frac{1}{r}\right)\right)\frac{1}{r}\sum_{i=1}^{r} D_{KL}\left(p_{R_i}\left\|U\left(\frac{1}{c}\right)\right.\right) + \frac{1}{c}\sum_{j=1}^{c} D_{KL}\left(p_{C_j}\left\|U\left(\frac{1}{r}\right)\right.\right), \quad [4]$$

where $$D_{KL}(p \| q) = \sum_{x} p(x)\log_2\frac{p(x)}{q(x)}$$

by:
can represent the Kullback-Leibler (KL) divergence between two probability distributions $p(x)$ and $q(x)$. The adjacent windows can thus be clustered using this objective function, minimizing it in order to yield highly dissimilar clusters across the windows. The space over which this minimization can be performed is further described herein below. Since the KL divergence of virtually any distribution with respect to the uniform distribution can differ from its negative entropy by a constant (when the sizes of the supports of the distributions are fixed), exemplary equation 4 can be equivalently expressed as:

$$\mathcal{F} = -\frac{1}{r}\sum_{i=1}^{r} H(R_i) - \frac{1}{c}\sum_{j=1}^{c} H(C_j), \quad [5]$$

$$= -\frac{1}{r}\sum_{i=1}^{r} H(\beta \mid a = i) - \frac{1}{c}\sum_{j=1}^{c} H(\alpha \mid \beta = j).$$

Thus the function $\mathcal{F}$ can capture the mutual information between the clusterings in adjacent windows.

A goal can be to minimize $\mathcal{F}$ and obtain clusters for either segment that can be local within each segment (similar to a k-means algorithm) but have high dissimilarity when compared with clusterings from the neighboring segment. This can be achieved by, e.g., parameterizing $\mathcal{F}$ in terms of cluster prototypes, defining the cluster random variables to capture locality in their respective spaces, and optimizing $\mathcal{F}$ using an augmented Lagrangian algorithm. Soft clusters can be used so that each gene can be a member of multiple clusters within a segment, with different probabilities.

The preceding exemplary analysis is based on the assumption that two adjacent segments are given and it is possible to merely seek to find clusters that are maximally dissimilar across the segments, for example. To identify the segments initially, a dynamic programming algorithm can be utilized. Using minimum and maximum segment length constraints, it is possible to consider all (or substantially all) possible "tilings" of the time course where every pair of neighboring tiles can reduce to the problem described above, e.g., where the evaluation can consist of applying an exemplary clustering framework and determining the minimized value of $\mathcal{F}$. These objective function values can then be summed over an entire segmentation and used to evaluate one segmentation over another. Computationally, this can reduce to a shortest path algorithm where each edge length can be given by the minimized value of $\mathcal{F}$. Each optimization can be performed in a matter of a few seconds on a desktop computer so that the entire segmentation can be computable in a relatively short time-frame (e.g., a few minutes).

Exemplary Results.

Specific strains of *Saccharomyces cerevisiae* have been shown to likely have two robust biological cycles occurring simultaneously, e.g., the metabolic and cell cycles (see, e.g., Futcher, B., *Metabolic cycle, cell cycle, and the finishing kick to start*, Genome Biol 7:107 (2006); and Palkova., Z. and Vachova, L., *Life within a community: benefit to yeast long-term survival*, FEMS Microbiol Rev 30:806-824 (2006)). Exemplary framework according to the present disclosure can be validated through, e.g., analysis of five yeast gene expression datasets, including two YMC time courses involving two different strains grown under two different conditions (YMC1: CEN.PK122 diploid strain, glucose-limited cultures (see Tu et al., supra.) and YMC2: IFO 0233 diploid strain, not glucose limited (see Klevecz et al., supra.), a YCC dataset after release from α-factor synchronization (YCC: DBY8724 strain (see Spellman et al., supra.), and observations of the cell cycle under treatment of HP and MD (see Shapira, M., Segal, E., Botstein, D., *Disruption of yeast forkhead-associated cell cycle transcription by oxidative stress*, Mol Biol Cell 15:5659-5669 (2004)). It is possible for exemplary embodiments according to the present disclosure to recover intricate temporal relationships across these datasets. For example, the questions sought to be addressed can be, e.g., which processes precede/succeed others, are there periodicity relationships underlying a dataset, and what stages serve as checkpoints or prerequisites for others.

Exemplary Yeast Cell Cycle.

Figure 8A:
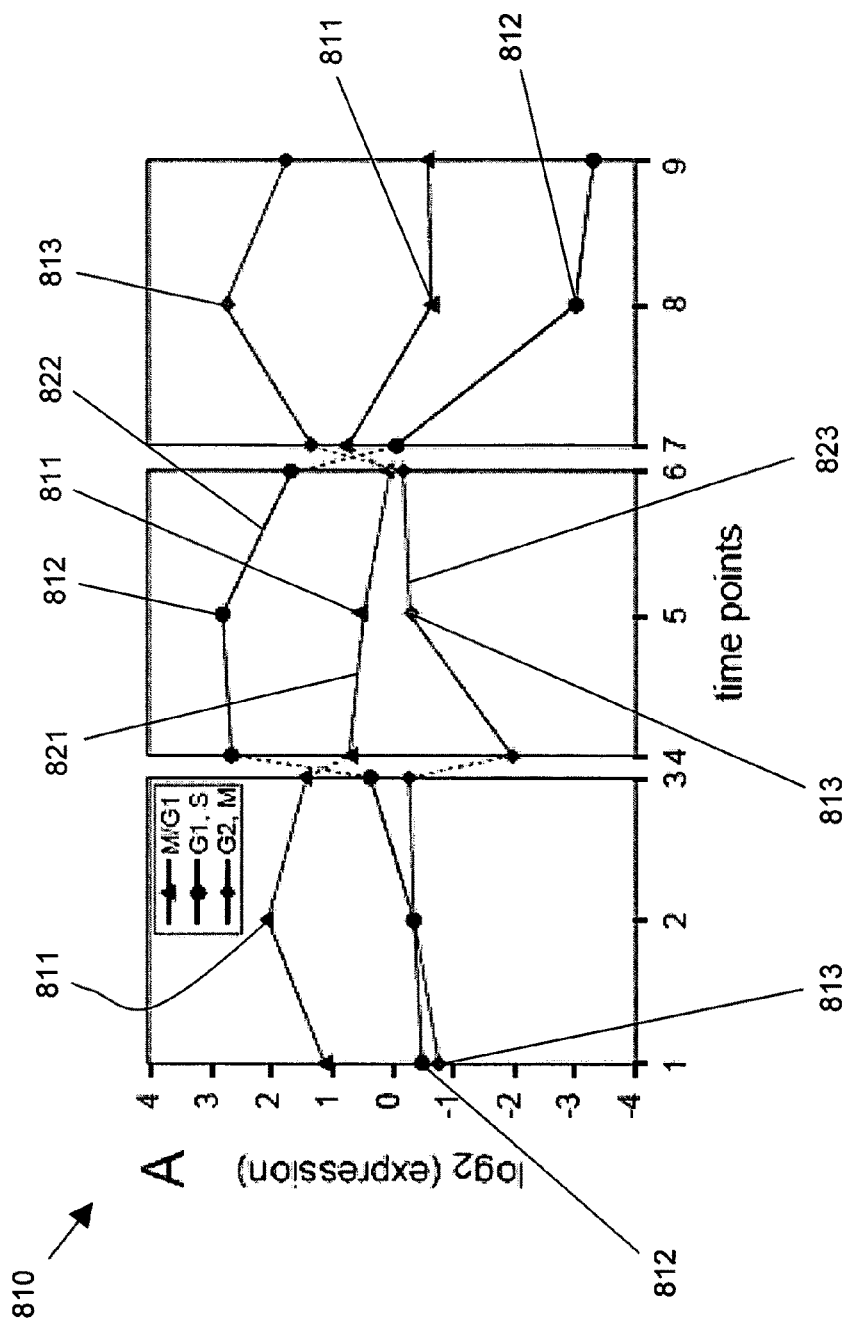
FIG. 8A is an illustration an exemplary plot of data from YCC experiments/studies.
Figure 8C:
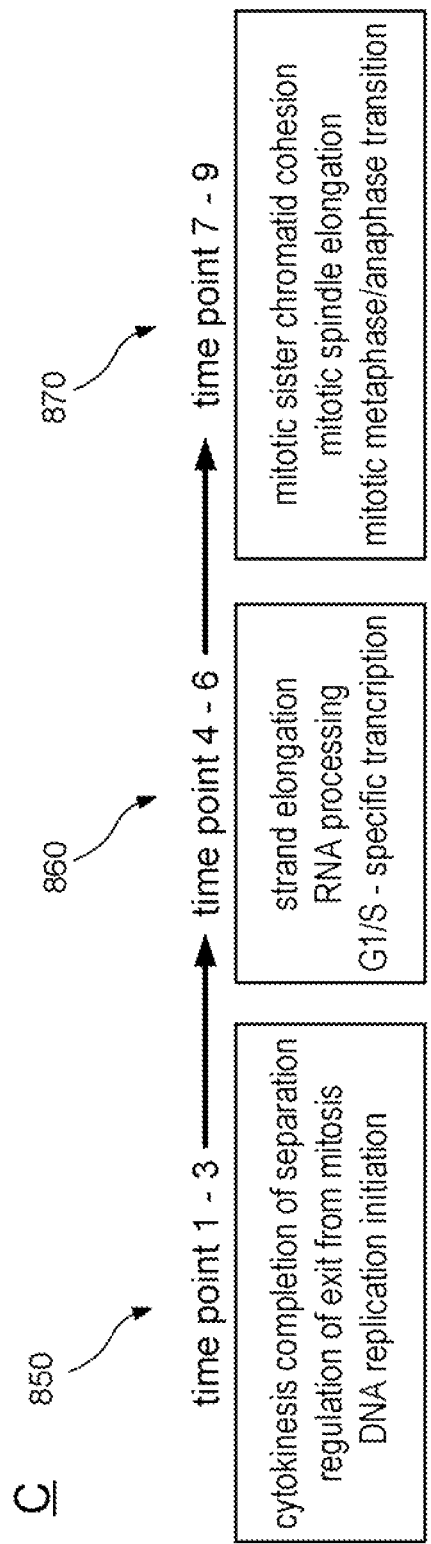
FIG. 8C shows exemplary Gantt chart views corresponding to the exemplary plot of FIG. 8A and exemplary contingency tables of FIG. 8B.

According to certain exemplary embodiments of the present disclosure, it is possible to compute the optimal segmentation for the YCC α-factor synchronization experiment described in Spellman et al. (see Spellman et al., supra.) using an exemplary programming procedure. This dataset can be or include two exemplary cycles. FIGS. 8A-8C illustrate one of the two exemplary cycles. For example, to understand the temporal nature of the underlying dataset, as shown in FIGS. 8A-8C, each window can be labeled with only functions from the cluster whose mean expression peaks during the window.

In particular, FIG. 8A shows an illustration an exemplary plot 810 of data from YCC experiments/studies that can involve the staged coordination of several phases, e.g., M/G1 time points 811, G1,S time points 812 and G2,M time points 813. As shown in FIG. 8A, the corresponding mean expression profiles 821, 822, 823 for each group of genes can depict the changing emphasis across the three phases.

FIG. 8B shows exemplary contingency tables 830 that capture the concerted grouping of genes within segments. FIG. 8B further illustrates exemplary contingency tables 840 that can capture the regroupings between segments. As shown in FIG. 8B, contingency tables 830 can involve significant enrichments, whereas tables 840 can approximate a uniform distribution.

FIG. 8C shows how Gantt chart views 850, 860, 870 corresponding to the exemplary plot 810 of FIG. 8A and exemplary contingency tables 830, 840 of FIG. 8B can depict the temporal coordination of biological processes underlying the dataset. In this example, only some of the exemplary enriched functions are shown in FIG. 8C.

Several qualitative observations can be made from the segmentation in the example shown in FIGS. 8A-8C. First, it is possible to observe how clusters within each window can offer significant enrichments of biological processes. Second, exemplary segmentation can reveal the cyclic nature of the dataset, e.g., alternating M/G1, {G1,S}, {G2,M} phases, without explicit instruction. By studying the processes enriched in each segment illustrated in FIGS. 8A-8C, careful coordination of the cell cycle can easily be seen. The YCC time-course data can span approximately two points each for phases M/G1, G1, and S can span only one time point for the G2 phase. Because a minimum window length can be three according to certain exemplary embodiments of the present disclosure (e.g., set so as to be able to recover significant clusterings and regroupings), it is possible that the these short-lived phases with this dataset cannot be precisely resolved, although continuous representations such as spline fits can be used to gain greater resolution of data sampling (see Ernst, J., Nau, G. J. and Bar-Joseph, Z., *Clustering short time series gene expression data*, Bioinformatics 21:i159-i168 (2005)). Nevertheless, the significant events that can be occurring in these segments can be retrieved with high specificity, e.g., $p<10^{-7}$. in accordance with certain exemplary embodiments of the present disclosure.

Exemplary Yeast Metabolic Cycle.

While the YCC may have been well studied, the timing relationships in the YMC have likely only recently become elucidated. For example, a main result of certain studies can be the existence of three key clusters of expression patterns that can oscillate coordinatively through the metabolic cycle phases, influenced by careful transcriptional control. Exemplary embodiments according to the present disclosure can recover the underlying temporal relationships in both the YMC datasets studied here.

Figure 9A:
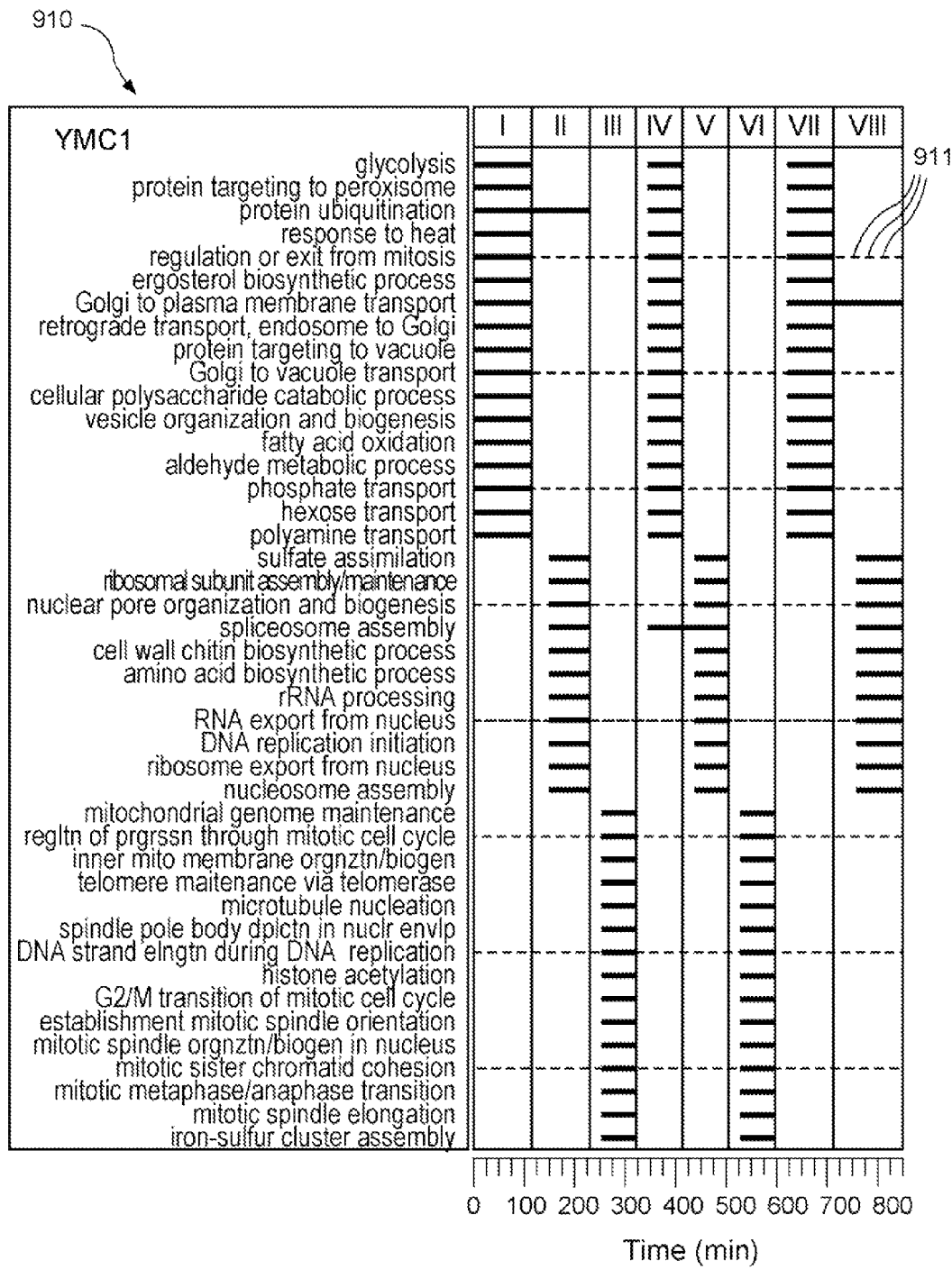
FIG. 9A is another table showing segmentation that can result from an exemplary analysis according to the present disclosure.
Figure 9B:
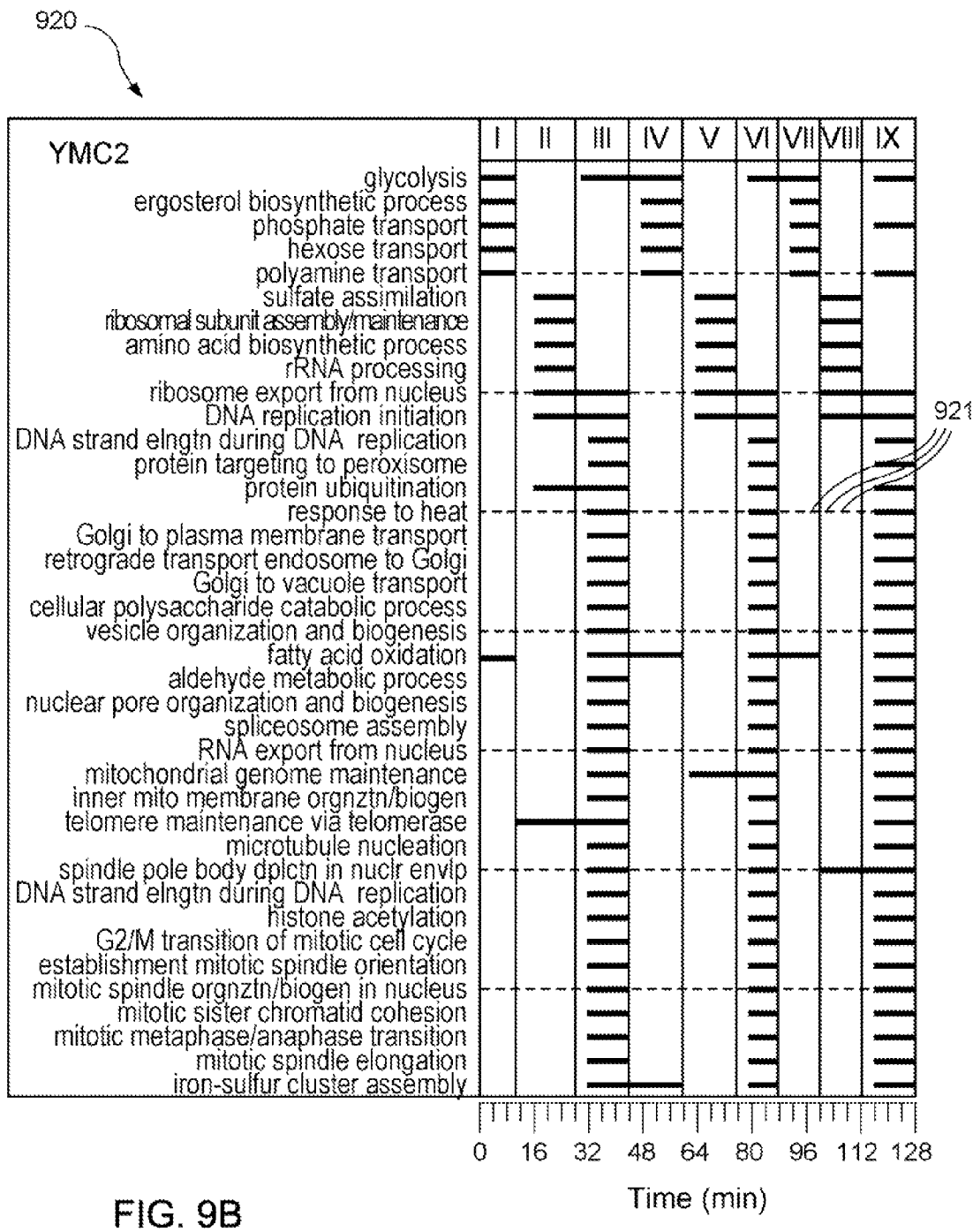
FIG. 9B is a table showing segmentation that can result from an exemplary analysis according to the present disclosure.

For example, FIGS. 9A and 9B illustrate exemplary tables 910 and 920, respectively, that show segmentation that can result from an exemplary analysis according to the present disclosure of transcriptional profiling datasets evaluating the rhythmical growth of *S. cerevisiae* (YMC1: diploid CEN.PK122, nutrient-limited conditions; YMC2: diploid IFO0233, not nutrient limited). The time line of each experiment is shown with each hash mark 911, 921 indicating a sampling point. As shown in FIGS. 9A and 9B, exemplary embodiments according to the present disclosure can accurately determine the G1, S, and G2/M phases of the cell cycle, respectively. The genes associated with each segment in this example were culture and strain-dependent.

In particular, FIG. 9A illustrates that eight segments were inferred for YMC1. These segments can correspond to the successive reductive building (R/B), charging (R/C), and oxidative (Ox) phases of the metabolic cycle. The gene ontology (GO) categories enriched ($p<10^{-7}$) can be clearly seen to be cyclic in nature.

FIG. 9B shows that the same exemplary analysis applied to the YMC2 dataset can yield nine segments, corresponding to three successive R/C, Ox, and R/B phases. The overlap in GO categories between YMC1 and YMC2 can be fairly dramatic, especially with regards to processes associated with cell division. As shown by a comparison of tables 910 and 920, GO categories can be associated with the R/B segment of YMC2 growth relative to YMC1. Such differences can be related to differences in growth conditions as well as the strain employed, for example.

Exemplary Hydrogen Peroxide and Menadione Oxidative Stress.

The effects of HP and MD on yeast strain DBY8724 were evaluated recently through temporal transcriptional profiling. In the case of the peroxide treatment, cells were synchronized with α-factor, exposed to HP for a set period of time, and subsequently released from the oxidative stress. GOALIE analysis of this dataset returned time segmentations that corresponded to the three main phases of the cell cycle, as shown in FIGS. 10A and 10B.

Figure 10A:
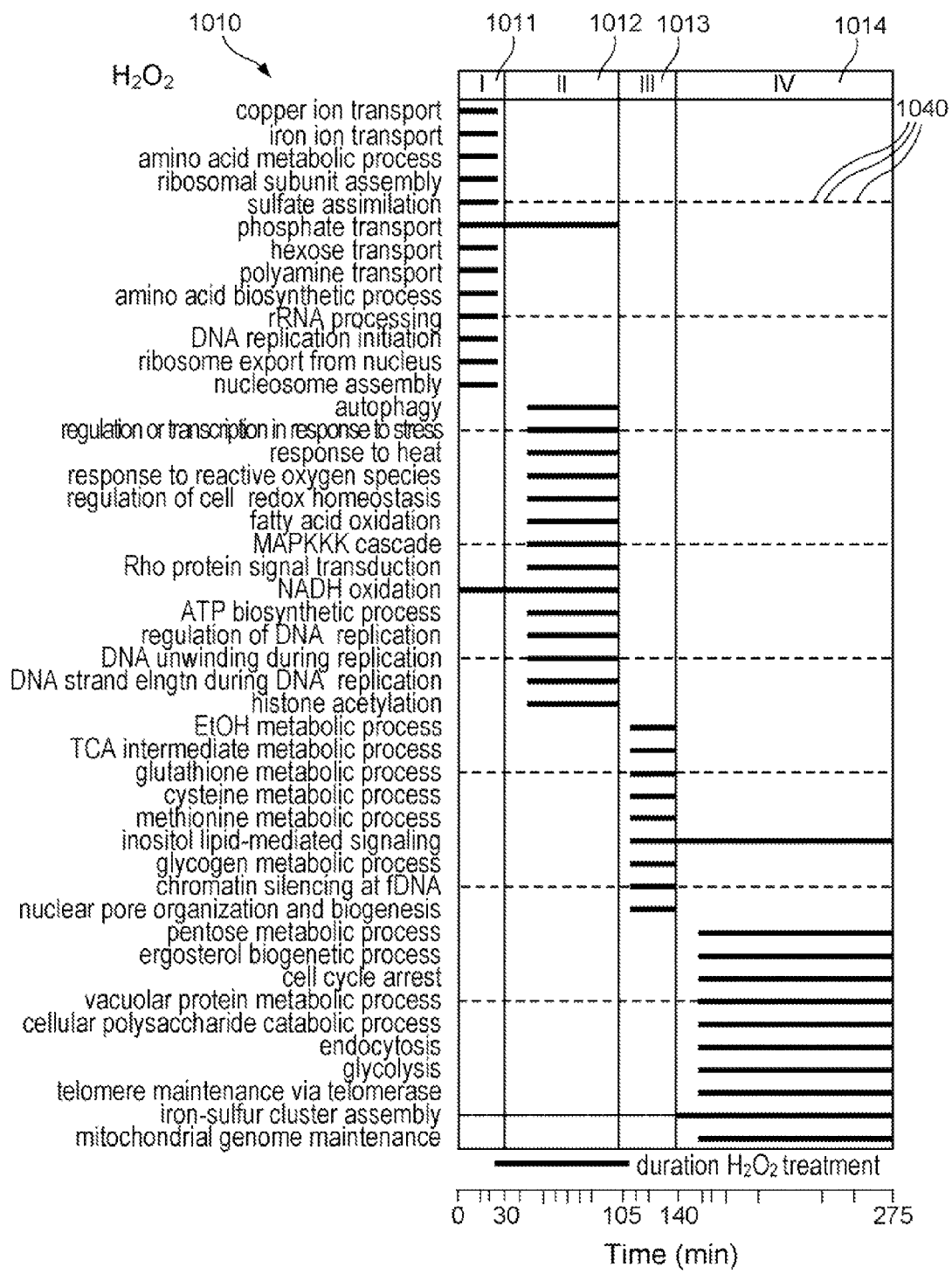
FIG. 10A is a table showing segmentation resulting from an exemplary analysis according to the present disclosure.
Figure 10B:
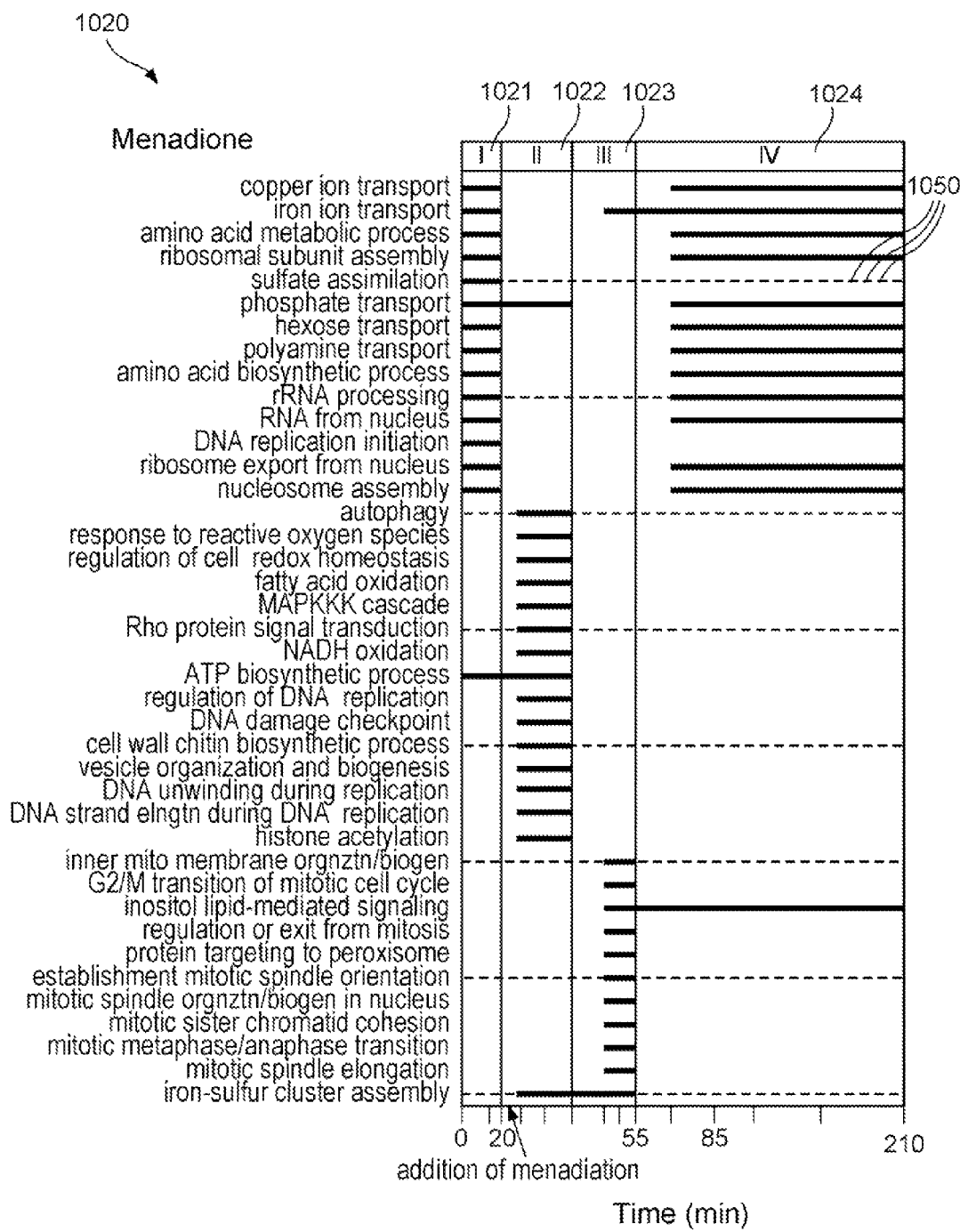
FIG. 10B is a table showing segmentation resulting from another an exemplary analysis according to the present disclosure.

In particular, FIGS. 10A and 10B provide illustrations of exemplary tables 1010 and 1020, respectively, which show segmentation resulting from an exemplary analysis according to the present disclosure of a transcriptional profiling dataset evaluating the exposure of *S. cerevisiae* (BY8743) to HP (0.2 mM) and MD (2 mM). The time line of the experiment is shown, where each hash mark 1040, 1050 indicates a sampling point, and the duration of the treatment is above the time line. Exemplary embodiments according to the present disclosure accurately assigned Segments 11011, 1021 II 1012, 1022 and IV 1014, 1024 of the peroxide dataset to the times when the cells are predominantly in G1, S, and G2/M phases of the cell cycle, respectively. Segment III 1013, 1023 putatively represents the combined transition between phases of the cell cycle as well as the release from oxidative stress. The prevalence of genes associated with core metabolic processes including sulfur metabolism is shown in FIGS. 10A and 10B. As further shown in FIGS. 10A and 10B, the exemplary analysis of the MD treatment resulted in the assignment of the cell cycle stages (I-III) as well as the G1 arrest.

Exemplary Process Modeling.

According to certain exemplary embodiments of the present disclosure, a combined, dynamic, temporal process model can be inferred from all of the datasets shown in FIG. 7, for example. The exemplary model can capture the interplay between the YMC and YCC, and the cyclic nature of their time courses. The exit of cells from the cell cycle due to HP treatment and subsequent cell cycle arrest is also captured. It is possible that these transitions can involve the cysteine and glutathione metabolic processes that drive the transition to cell cycle arrest. The transitions involving MD do not indicate a similar exit likely because the cells complete one full cycle before getting arrested.

The ability to identify segments of interest in temporal datasets without supervisory input permits analysis of the interplay between biological processes. Through exemplary temporal models, it has been shown that *S. cerevisiae* can act in a somewhat unified fashion, with cell cycles based on core metabolism and cell division. Connections between the YMC and the YCC can have been under investigation, which can have generated interesting hypotheses involving biochemical process compatibility versus coordinated metabolic "bursts". An underlying assumption can be that, choreographed by these two predominant cycles, the availability of energy can control whether a yeast cell divides or not, can motivate many other important questions, such as what are the major intracellular and extracellular molecules that control an individual cell and its decision to divide. The question may be as to whether it is possible to use gene knockouts and/or growth condition modifications to separate the YMC and YCC so that they are independent of one another.

For example, an exemplary investigation of the transcriptional profiling associated with peroxide stress identified a time segment that corresponded to an "intermediate stage" where the yeast cells were recovering from peroxide stress. The GO categories enriched in this segment were related to core metabolic processes (ethanol, TCA, glycogen), sulfur metabolism, and inositol lipid-mediated signaling, as well as chromatin silencing and nuclear pore organization/biogenesis. While sulfur metabolism can be associated directly with the oxidative stress response, the linkage to inositol lipid-mediated signaling genes and chromatin silencing is a bit more remote. Further analysis can be necessary to elucidate these connections. Nevertheless, exemplary tools can bring out the nature of temporal "hardwiring" manifest in biological processes. In particular they can open up questions related to whether it would be possible to manipulate the system to adopt an aberrant cell state or make it proceed along a desired temporal order. For instance, the identification of unique transcriptional states such as found in Segment III of the peroxide treatment suggests that at this stage in the cell growth regime it may be possible to force the organism to adopt aberrant states. For example, exit from peroxide treatment results in entry into the G2/M state. Another question can be what the effect would be of adding alpha factor to the growth medium directly after release from peroxide stress. Yet another question can be as to whether the cells continue through the cell cycle once before entering into G1, or move directly to G1. Questions such as these are the focus of a future research project to be initiated, according to certain exemplary embodiments of the present disclosure.

By formulating the search for an optimal segmentation in mathematical terms, it is possible to use dynamic programming to reconstruct important temporal progressions and cycles in molecular biology. An augmented Lagrangian algorithm has been devised, implemented and tested to identify clusters of genes that dynamically regroup across important breakpoints in the time series. Simply by extracting and analyzing the connections between the YMC and the YCC processes, which had remained latent in published data, it is possible to refine hypotheses involving biochemical process compatibility versus coordinated metabolic "bursts".

Exemplary Methods

Exemplary Datasets and Data Preprocessing.

Exemplary datasets came from a variety of sources. For each dataset described below, it is possible to retain only genes that have an annotation in the GO biological process taxonomy (revision 4.205 of GO released on Mar. 14, 2007), log transformed (base 10) their expression values and normalized them such that the mean expression of each gene across all time points is zero. The YMC1 dataset (see Tu et al., supra.) consists of 36 time points collected over three continuous cycles. The original dataset consists of 6,555 unique genes from the S. cerevisiae genome from which after preprocessing as described above it is possible to retain 3,602 genes. It is also possible to analyze another YMC2 dataset (see Klevecz et al., supra.) with 32 time points collected over three continuous cycles. (While in YMC1 (see Tu et al., supra.) the authors claim that the cycle length is approximately 5 h, in YMC2 (see Klevecz et al., supra.), the authors claim that this cycle length is approximately 40 min.) Again, 3,602 genes were retained. As an exemplary third dataset, the well known YCC dataset was analyzed from experiments performed by Spellman et al. (see Spellman et al., supra.). There are three components to the Spellman et al. YCC data, following three different cell synchronization treatments with α-factor, cdc 15, and elutriation. Described herein is an exemplary analysis of the α-factor dataset that has 6,076 genes with 18 time points over approximately two cycles. Exemplary preprocessing results in a universal set of 2,196 genes. Additionally, datasets from the experiments conducted by Shapira et al. (see Shapira et al., supra.) were analyzed, who studied the effects of oxidative stress induced by HP and MD on the YCC. The analyzed datasets included HP and MD which were added to the cells at 25 min after release from G1 arrest. The cells treated with HP were arrested in the subsequent G2/M phase while those treated with MD go through one cell cycle and were arrested in the G1 phase of next cycle. The HP dataset has 20 time points while the MD dataset has 14 time points. After preprocessing, a final set of 2,471 genes in HP, and 2,247 genes in MD datasets were obtained.

Exemplary Dynamic Programming Procedure for Optimal Segmentation.

It is possible to apply a dynamic programming algorithm for segmenting the various time series. It is also possible to use different settings for the numbers of clusters and different thresholds for minimum and maximum possible window lengths to search in the space of possible segmentations. Besides the number of clusters in each segment, and minimum/maximum constraints on window lengths, it is possible to parameterize the segmentation procedure with a parameter $\lambda$ that controls the sizes of the clusters in the resulting segmentations and can be adjusted to yield approximately equal cluster sizes. For YMC1, it is possible to experiment with the number of clusters in each segment ranging from 3-15, a minimum window length of 4 and maximum window length of 7, and $\lambda=1.4$. For YMC2, the number of clusters can be varied between 3-15, with minimum and maximum window lengths of 3 and 6 respectively, and $\lambda=1.35$. For the YCC, it is possible to have a range from 3-15 clusters in each window with a minimum window length of 3 and maximum window length of 5, and $\lambda=1.25$. For segmenting the HP and MD datasets, the number of clusters can be varied between 3-15, with minimum and maximum window lengths of 3 and 7 respectively, and $\lambda=1.55$. After the segmentation reveals windows and clusters of genes in each window, it is possible to perform functional enrichment over the selected sets of genes. A hypergeometric p-value can be calculated for each GO biological process term, and an appropriate cutoff can be chosen using false discovery rate q-level of 0.01 (see, e.g., Storey, J. and Tibshirani, R., *Statistical significance for genomewide studies*, Proc Nat'l Acad Sci USA 100:9440-9445 (2003)). The time bounded enrichments can be summarized as Gantt charts, such as described herein above. Further, it is possible to employ various statistical tests to assess the sensitivity of the segmentation to variations in the number of clusters.

Exemplary Inferring Temporal Coordination of Processes.

It is possible to derive temporal process models from Gantt charts as follows: Given two neighboring segments, each of the processes enriched in the first segment can precede (e.g., can have a state transition to) a process enriched in the second segment. Then, it is possible to find maximal sets of processes that are common across two or more datasets that obey the same precedence relationships. These sets can constitute the states of the Kripke structure and the transitions between the sets can be labeled with the experimental conditions where they are observed. For ease of comprehension, the Kripke structure can be projected down to a subset of processes and/or subset of conditions in order to bring out specific temporal relationships between these exemplary processes across the specified conditions, for example.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. In addition, all publications, patents and patent applications referenced herein are incorporated herein by reference in their entireties.

What is claimed is:

1. A method for at least one of generating or utilizing a model associated with a data set using predetermined semantics, comprising:
   organizing the data set into a plurality of states and a plurality of state transitions, wherein at least one transition of the plurality of state transitions is associated with each of the states;
   associating each of the states with at least one label relating to the predetermined semantics;
   assigning at least one probability to at least one state of the plurality of states based on a likelihood that the at least one state follows the at least one transition associated with the at least one state;
   determining at least one invariant associated with the model as a function of the at least one probability; and
   re-organizing the data set into a plurality of further states and a plurality of further state transitions based at least in part on the at least one probability assigned to the at least one state, wherein at least one further transition of the plurality of further state transitions is associated with each of the further states.

2. The method of claim 1, further comprising:
   receiving a query relating to the data set; and
   providing a response to the query based at least in part on the model.

3. The method of claim 1, wherein the data set comprises at least one of modal data, temporal data or functional data.

4. The method of claim 1, wherein the data set is associated with at least one of a gene expression, a probe value, a click on a web link, or a cellular event.

5. The method of claim 1, wherein the data set is arranged in a form of a matrix.

6. The method of claim 1, wherein the data set is organized using at least one of a clustering procedure, a K-means procedure, an SOM procedure, an agglomerative procedure, a graph-based procedure, a biclustering procedure, or an information-bottleneck-based procedure.

7. The method of claim 1, wherein the predetermined semantics are provided by at least one of a controlled vocabulary, an ontology, a gene ontology, a prior knowledge relating to the data set, a procedure which operates on gene expression data, or a statistical text mining procedure.

8. The method of claim 1, wherein the at least one probability is determined using at least one of a Fisher exact test or a Jacquard coefficient technique.

9. The method of claim 1, wherein the at least one invariant is determined using at least one of a modal logic technique, a linear-time temporal logic technique, a branching-time temporal logic technique, or a fuzzy logic technique.

10. The method of claim 1, wherein the at least one invariant is determined by combining at least two labels.

11. The method of claim 10, further comprising combining at least two labels using at least one of a model checking technique or an iterative extension technique.

12. A system for at least one of generating or utilizing a model associated with a data set using predetermined semantics, comprising:
 a computer hardware arrangement configured to;
 (a) organize the data set into a plurality of states and a plurality of state transitions, wherein at least one transition of the plurality of state transitions is associated with each of the states;
 (b) associate each of the states with at least one label relating to the predetermined semantics;
 (c) assign at least one probability to at least one state of the plurality of states based on a likelihood that the at least one state follows the at least one transition associated with the at least one state;
 (d) determine at least one invariant associated with the model as a function of the at least one probability; and
 re-organize the data set into a plurality of further states and a plurality of further state transitions based at least in part on the at least one probability assigned to the at least one state, wherein at least one further transition of the plurality of further state transitions is associated with each of the further states.

13. The system of claim 12, wherein the computer hardware arrangement is further configured to:
 (e) receive a query relating to the data set; and
 (f) provide a response to the query based at least in part on the model.

14. The system of claim 12, wherein the computer hardware arrangement is further configured to organize the data set using at least one of a clustering procedure, a K-means procedure, an SOM procedure, an agglomerative procedure, a graph-based procedure, a biclustering procedure, or an information-bottleneck-based procedure.

15. A non-transitory computer-accessible medium having stored thereon computer-executable instructions for at least one of generating or utilizing a model associated with a data set using predetermined semantics, wherein, when a computer hardware arrangement executes the instructions, the computer arrangement is configured to perform procedures comprising:
 organizing the data set into a plurality of states and a plurality of state transitions, wherein at least one transition of the plurality of state transitions is associated with each of the states;
 associating each of the states with at least one label relating to the predetermined semantics;
 assigning at least one probability to at least one state of the plurality of states based on a likelihood that the at least one state follows the at least one transition associated with the at least one state;
 determining at least one invariant associated with the model as a function of the at least one probability; and
 re-organizing the data set into a plurality of further states and a plurality of further state transitions based at least in part on the at least one probability assigned to the at least one state, wherein at least one further transition of the plurality of further state transitions is associated with each of the further states.

16. The computer-accessible medium of claim 15, wherein the processing arrangement is further configured to:
 receive a query relating to the data set; and
 provide a response to the query based at least in part on the model.

17. The computer-accessible medium of claim 15, wherein the processing arrangement is further configured to organize the data set using at least one of a clustering procedure, a K-means procedure, an SOM procedure, an agglomerative procedure, a graph-based procedure, a biclustering procedure, or an information-bottleneck-based procedure.

* * * * *